（12） United States Patent
Yoneda

(10) Patent No.: US 9,953,792 B2
(45) Date of Patent: *Apr. 24, 2018

(54) SHORT-CIRCUIT ELEMENT AND A CIRCUIT USING THE SAME

(71) Applicant: DEXERIALS CORPORATION, Tokyo (JP)

(72) Inventor: Yoshihiro Yoneda, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 411 days.

This patent is subject to a terminal disclaimer.

(21) Appl. No.: 14/819,061

(22) Filed: Aug. 5, 2015

(65) Prior Publication Data

US 2015/0340182 A1 Nov. 26, 2015

Related U.S. Application Data

(63) Continuation of application No. PCT/JP2014/052634, filed on Feb. 5, 2014.

(30) Foreign Application Priority Data

| Feb. 5, 2013 | (JP) | ................................. 2013-020756 |
| Feb. 8, 2013 | (JP) | ................................. 2013-023171 |
| Feb. 12, 2013 | (JP) | ................................. 2013-024643 |
| Jun. 13, 2013 | (JP) | ................................. 2013-125077 |

(Continued)

(51) Int. Cl.
*H01H 85/00* (2006.01)
*H01H 85/02* (2006.01)
(Continued)

(52) U.S. Cl.
CPC ........ *H01H 85/055* (2013.01); *H01H 37/761* (2013.01); *H01H 37/767* (2013.01); *H01H 61/02* (2013.01); *H01H 85/0056* (2013.01); *H01H 85/0241* (2013.01); *H01M 2/348* (2013.01); *H01M 10/425* (2013.01);
(Continued)

(58) Field of Classification Search
CPC .... H01H 37/761; H01H 37/767; H01H 61/02; H01H 85/0056; H01H 85/0241; H01H 85/055; H01H 2231/026; H01M 2/348; H01M 10/425; H01M 10/441;
(Continued)

(56) References Cited

U.S. PATENT DOCUMENTS

| 6,275,005 | B1 * | 8/2001 | Stadnick | ................. | H01M 2/34 257/665 |
| 6,420,852 | B1 | 7/2002 | Sato | | |

FOREIGN PATENT DOCUMENTS

| JP | 2000-133318 A | 5/2000 |
| JP | 2007-012381 A | 1/2007 |
| JP | 2010-003665 A | 1/2010 |

OTHER PUBLICATIONS

Mar. 4, 2014 Search Report issued in International Patent Application No. PCT/JP2014/052634.

(Continued)

*Primary Examiner* — Thienvu Tran
*Assistant Examiner* — Kevin J Comber
(74) *Attorney, Agent, or Firm* — Oliff PLC

(57) ABSTRACT

A bypass avoiding only abnormal cells or abnormal electronic components in an electronic appliance having a plurality of battery cells or electronic components is formed to decrease resistance while keeping functionality.

95 Claims, 16 Drawing Sheets

(30) Foreign Application Priority Data

Jun. 13, 2013 (JP) ................................. 2013-125078
Jun. 13, 2013 (JP) ................................. 2013-125079

(51) Int. Cl.
*H01M 2/34* (2006.01)
*H01H 85/055* (2006.01)
*H01H 37/76* (2006.01)
*H01H 61/02* (2006.01)
*H01M 10/42* (2006.01)
*H01M 10/44* (2006.01)
*H01M 10/48* (2006.01)

(52) U.S. Cl.
CPC ....... *H01M 10/441* (2013.01); *H01M 10/482* (2013.01); *H01H 2231/026* (2013.01); *H01M 2200/10* (2013.01); *H01M 2200/103* (2013.01); *H01M 2200/108* (2013.01)

(58) Field of Classification Search
CPC ........... H01M 10/482; H01M 2200/10; H01M 2200/103; H01M 2200/108
USPC .......................................................... 361/54
See application file for complete search history.

(56) References Cited

OTHER PUBLICATIONS

Nov. 17, 2017 Office Action issued in U.S. Appl. No. 14/819,328.
Nov. 17, 2017 Notice of Allowance issued in U.S. Appl. No. 14/818,862.

\* cited by examiner

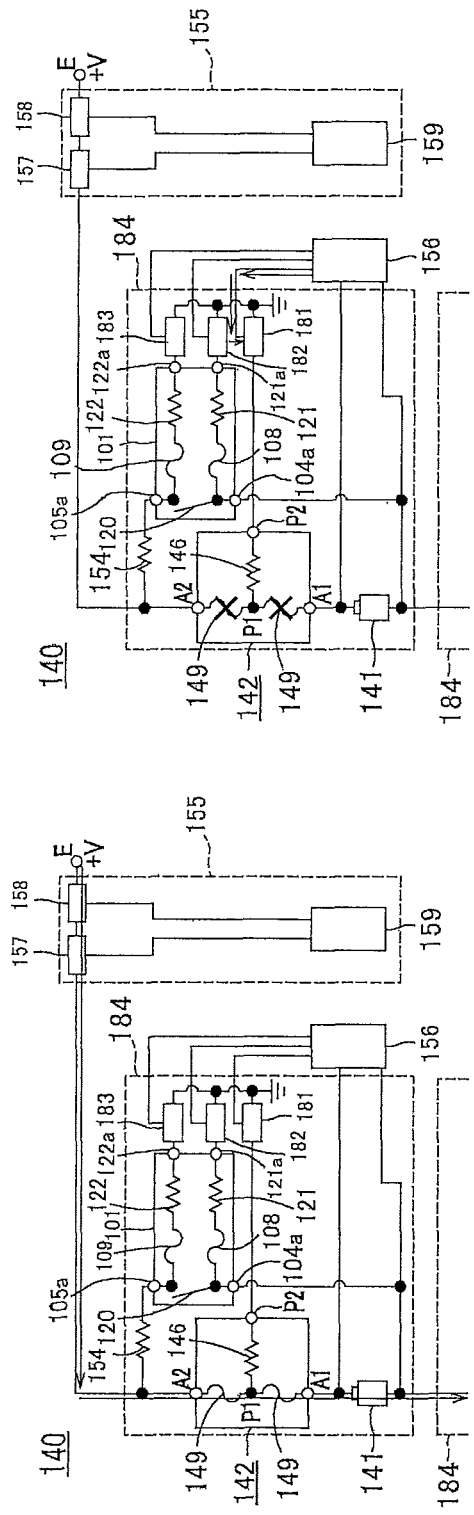
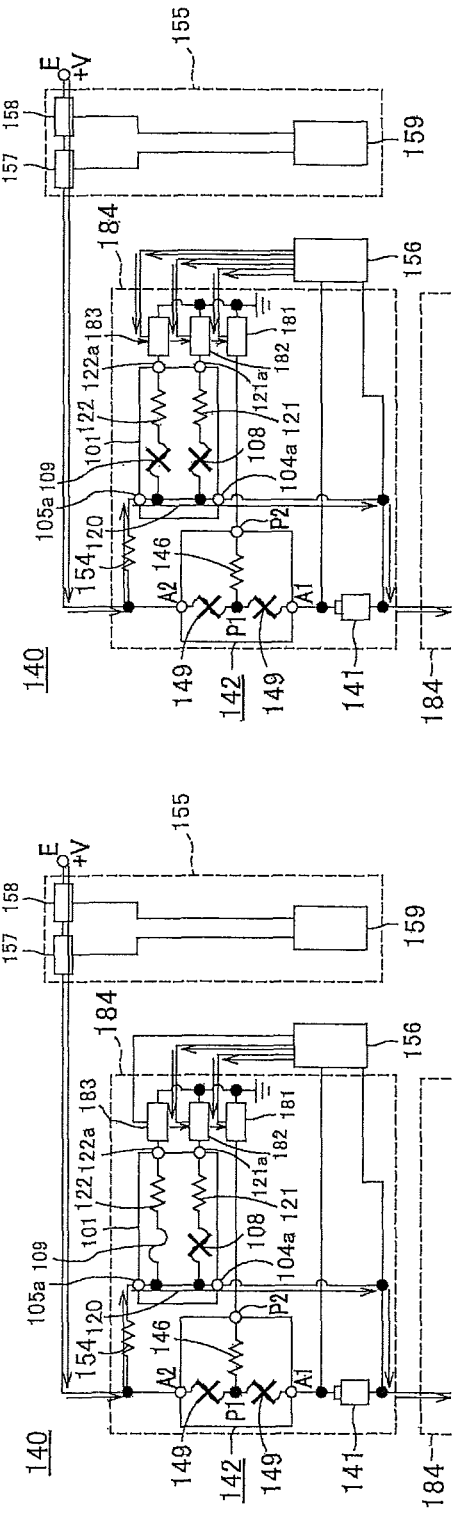
FIG.10A  FIG.10B  FIG.10C  FIG.10D

SHORT-CIRCUIT ELEMENT AND A CIRCUIT USING THE SAME

TECHNICAL FIELD

This invention relates to a short-circuit element and a circuit using the same having a heat-generating resistor and a fuse element formed on a substrate to bypass only abnormal components within an electronic appliance.

BACKGROUND ART

Secondary batteries are often provided to users in the form of rechargeable battery packs which can be repeatedly used. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Some of these protective elements use an FET switch incorporated in a battery pack to turn ON/OFF the output, for over-charging protection or over-discharging protection of the battery pack. However, even in the cases of the FET switch being short-circuited and damaged for some reason, a large current momentarily flows caused by a surge such as a lightning surge, and an abnormally decreased output voltage or an excessively high voltage occurs in an aged battery cell, the battery pack or the electronic appliance should prevent accidents including fire, among others. For this reason, a protective element is used having a fuse which interrupts a current path in accordance with an external signal so as to safely interrupt the output of the battery cell under these possible abnormalities.

PLT 1 discloses a protective element of a protective circuit for a lithium ion secondary battery in which a meltable conductor is connected as a part of a current path from a first electrode, through a conductive layer connected to a heat-generating element, to a second electrode, and this meltable conductor in the current path is blown by self-heating due to an overcurrent or by a heat-generating element provided in the protective element. In this protective element, the current path is interrupted by gathering of the fused meltable conductor in liquid phase onto the conducting layer connected to the heat-generating element.

Furthermore, there has been proposed an LED illumination apparatus in which short-circuit elements are connected to serially connected LED elements in parallel, the short-circuit elements are short-circuited by a predetermined abnormal voltage and normal LEDs emit light (PLT 2). In the short-circuit element of PLT 2, several elements sandwiching an insulating barrier layer having a predetermined film thickness are connected in series.

PRIOR ART LITERATURE

Patent Literatures

PLT 1: Japanese Unexamined Patent Application Publication No. 2010-003665
PLT 2: Japanese Unexamined Patent Application Publication No. 2007-12381

SUMMARY OF THE INVENTION

Problem to be Solved by the Invention

In recent years, hybrid electric vehicles (HEVs) and electric vehicles (EVs) using batteries and motors have become widely used. Lithium ion secondary batteries are employed as power sources for HEVs and EVs because of their advantages in energy density and output properties. These automotive applications require a high voltage and a large current. For this reason, many dedicated cells capable of enduring a high voltage and a large current are under development; however, in many cases, a plurality of general-purpose battery cells are provided and connected in series or in parallel to achieve necessary voltage and current.

In a vehicle such as an automobile moving at a high speed, there are cases in which a rapid decrease in driving power or a sudden stop of the vehicle is dangerous; therefore, a battery management appropriate for abnormal situations is required. For example, when a battery system abnormality occurs during vehicle operation, driving power to move to a repair shop or safe location and power to a hazard lamp or air conditioner is preferably supplied in view of risk avoidance.

Unfortunately, the battery pack of PLT 1 in which several battery cells are connected in series and the protective element is provided only on a charging/discharging path, when an abnormality occurs in a part of the battery cell activates the protective element, the entire charging/discharging path of the battery pack is interrupted such that the battery pack can no longer power.

On the other hand, in the short-circuit element described in PLT 2, the current/voltage characteristics curve exhibits a high resistance of 17 k$\Omega$ upon voltage application of 10 V; it is therefore desired to further decrease the resistance value in order to efficiently bypass an LED element in open state.

An object of the present invention therefore is to provide a short-circuit element and a circuit using the same capable of effectively utilize normal cells by forming a bypass path avoiding only abnormal cells in a battery pack having several cells.

Solution to Problem

An aspect of the present invention provides a short-circuit element comprising: an insulating substrate; a first and a second heat-generating resistors formed on the insulating substrate; a first and a second electrodes arranged adjacently to each other on the insulating substrate; a third electrode arranged adjacently to the first electrode on the insulating substrate and electrically connected to the first heat-generating resistor; a fourth electrode arranged adjacently to the second electrode on the insulating substrate and electrically connected to the second heat-generating resistor, a first meltable conductor arranged between the first and third electrodes to constitute a current path capable of being blown by a heat generated by the first heat-generating resistor; and a second meltable conductor arranged between the second and fourth electrodes to constitute a current path capable of being blown by a heat generated by the second heat-generating resistor, wherein the first and second meltable conductors are melted by the heat from the first and second heat-generating resistors and gather on the first and second electrodes to short-circuit the first and second electrodes.

Another aspect of the present invention provides a short-circuit element circuit comprising: a switch; a first fuse connected to one end of the switch; a second fuse connected to the other end of the switch; a first heat-generating resistor connected to the other end of the first fuse opposite to the end connected to the switch; and a second heat-generating resistor connected to the other end of the second fuse opposite to the end connected to the switch, wherein the switch is short-circuited by meltable conductor of the first and second fuses when the first and second fuses are blown.

Another aspect of the present invention provides a compensation circuit comprising: a short-circuit element comprising a switch, a first fuse connected to one end of the switch, a second fuse connected to the other end of the switch, a first heat-generating resistor connected to the other end of the first fuse opposite to the end connected to the switch, and a second heat-generating resistor connected to the other end of the second fuse opposite to the end connected to the switch, wherein the switch is short-circuited by meltable conductor of the first and second fuses when the first and second fuses are blown; an electronic component; a protective element connected in a current path of the electronic component, which disconnects the electrical connection to the electronic component in the case of an electronic; a protective component which detects an abnormality of the electronic component and outputs an abnormal signal; and a first to third controlling elements which operate in accordance with the abnormal signal from the protective component, wherein both terminals of the electronic component and the protective element are connected to both terminals of the switch in parallel, wherein the first and second heat-generating resistor, and an electric signal input terminal of the protective element are respectively connected to the first to third controlling elements, and wherein, in an abnormal situation of the electronic component, the first to third controlling elements operate in accordance with an abnormal signal from the protective component to disconnect the current path of the electronic component with the protective element and to short-circuit the switch in conjunction with melting of the first and second fuses to form a bypass current path.

Another aspect of the present invention provides a compensation circuit comprising: a short-circuit element comprising a switch, a first fuse connected to one end of the switch, a second fuse connected to the other end of the switch, a first heat-generating resistor connected to the other end of the first fuse opposite to the end connected to the switch, and a second heat-generating resistor connected to the other end of the second fuse opposite to the end connected to the switch, wherein the switch is short-circuited by meltable conductor of the first and second fuses when the first and second fuses are blown; an electronic component; a protective element connected in a current path of the electronic component, which disconnects the electrical connection to the electronic component in the case of an electronic signal; a protective component which detects an abnormality of the electronic component and outputs an abnormal signal; and a first and a second controlling elements which operate in accordance with the abnormal signal from the protective component, wherein both terminals of the electronic component and the protective element are connected to both terminals of the switch in parallel, wherein a terminal of the first heat-generating resistor is connected to the first controlling element, and a terminal of the second heat-generating resistor and an electric signal input terminal of the protective element are connected to the second controlling element, and wherein in an abnormal situation of the electronic component, the first and second controlling elements operate in accordance with an abnormal signal from the protective component to disconnect the current path of the electronic component with the protective element and to short-circuit the switch in conjunction with melting of the first and second fuses to form a bypass current path.

Another aspect of the present invention provides a short-circuit element circuit comprising: a switch; a first fuse connected to one end of the switch; a second fuse connected to the other end of the switch; a first heat-generating resistor connected to the other end of the first fuse opposite to the end connected to the switch; a second heat-generating resistor connected to the other end of the second fuse opposite to the end connected to the switch; and a protective resistor connected to the switch, wherein the switch is short-circuited by meltable conductor of the first and second fuses when the first and second fuses are blown.

Another aspect of the present invention provides a compensation circuit comprising: a short-circuit element comprising a switch, a first fuse connected to one end of the switch, a second fuse connected to the other end of the switch, a first heat-generating resistor connected to the other end of the first fuse opposite to the end connected to the switch, a second heat-generating resistor connected to the other end of the second fuse opposite to the end connected to the switch, and a protective resistor connected to the switch; an electronic component; a protective element connected in a current path of the electronic component, which disconnects the electrical connection to the electronic in the case of an electronic signal; a protective component which detects an abnormality of the electronic component and outputs an abnormal signal; and a first to third controlling elements which operate in accordance with the abnormal signal from the protective component, wherein both terminals of the electronic component and the protective element are connected to both terminals of the switch in parallel, wherein the first and second heat-generating resistor, and an electric signal input terminal of the protective element are respectively connected to the first to third controlling elements, and wherein, in an abnormal situation of the electronic component, the first to third controlling elements operate in accordance with an abnormal signal from the protective component to disconnect the current path of the electronic component with the protective element and to short-circuit the switch in conjunction with melting of the first and second fuses to form a bypass current path.

Another aspect of the present invention provides a compensation circuit comprising: a short-circuit element comprising a switch, a first fuse connected to one end of the switch, a second fuse connected to the other end of the switch, a first heat-generating resistor connected to the other end of the first fuse opposite to the end connected to the switch, a second heat-generating resistor connected to the other end of the second fuse opposite to the end connected to the switch, and a protective resistor connected to the switch, wherein the switch is short-circuited by meltable conductor of the first and second fuses when the first and second fuses are blown; an electronic component; a protective element connected in a current path of the electronic component, which disconnects the electrical connection to the electronic component in the case of an electronic signal; a protective component which detects an abnormality of the electronic component and outputs an abnormal signal; and a first and a second controlling elements which operate in accordance with the abnormal signal from the protective component, wherein both terminals of the electronic component and the protective element are connected to both terminals of the switch in parallel, wherein a terminal of the first heat-generating resistor is connected to the first controlling element, and a terminal of the second heat-generating resistor and an electric signal input terminal of the protective element are connected to the second controlling element, and wherein in an abnormal situation of the electronic component, the first and second controlling elements operate in accordance with an abnormal signal from the protective component to disconnect the current path of the electronic component with the protective element and to short-circuit the switch in conjunction with melting of the first and second fuses to form a bypass current path.

Another aspect of the present invention provides a mounting member in which a short-circuit element is mounted onto a mounting target, the short-circuit element comprising: an insulating substrate; a first and a second heat-generating resistors formed on the insulating substrate; a first and a second electrodes arranged adjacently to each other on the insulating substrate; a third electrode arranged adjacently to the first electrode on the insulating substrate and electrically connected to the first heat-generating resistor; a fourth electrode arranged adjacently to the second electrode on the insulating substrate and electrically connected to the second heat-generating resistor, a first meltable conductor arranged between the first and third electrodes to constitute a current path capable of being blown by a heat generated by the first heat-generating resistor; a second meltable conductor arranged between the second and fourth electrodes to constitute a current path capable of being blown by a heat generated by the second heat-generating resistor; and a first external connecting electrode continuous with the first electrode formed on the same surface as the first and second electrodes, and a second external connecting electrode continuous with the second electrode, wherein the first electrode is connected to the mounting target via the first external connecting terminal connected to the first external connecting electrode, and the second electrode is connected to the mounting target via the second external connecting terminal connected to the second external connecting electrode, and wherein a combined resistance of the first external connecting terminal and the second external connecting terminal is lower than a conduction resistance between the first and second external connecting electrodes when the first meltable conductor is melted by the heat from the first and second heat-generating resistors and gathers on the first and second electrodes to short-circuit the first and second electrodes.

Advantageous Effects of Invention

Moreover, the present invention can form a new bypass current path by short-circuiting normally-isolated first and second electrode by a meltable conductor gathered on the first and second electrode melted by heat from first and second heat-generating resistors.

BRIEF DESCRIPTION OF DRAWINGS

FIG. 10 (A) is a circuit diagram of an battery pack using a short-circuit element in a normal state, FIG. 10 (B) is a circuit diagram of the same in an abnormal state, and FIGS. 10 (C) and (D) are a circuit diagram of the same in a state in which a bypass current path is formed.

DESCRIPTION OF THE EMBODIMENTS

Figure 1A:
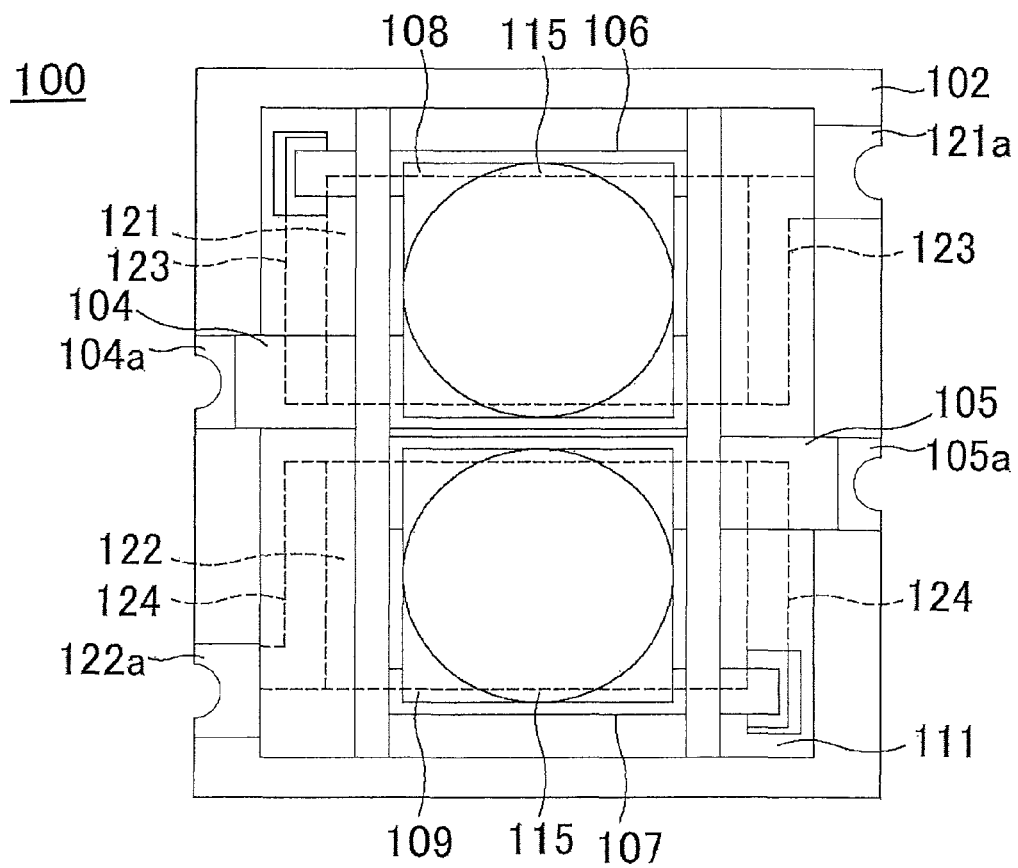
FIG. 1 (A) is a plan view of short-circuit element according to the present invention and FIG. 1 (B) is a cross-sectional view of the same.

Embodiment of short-circuit elements according to the present invention and circuits using the same will now be more particularly described with reference to the accompanying drawings. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

Embodiment

Short-Circuit Element

Figure 1B:
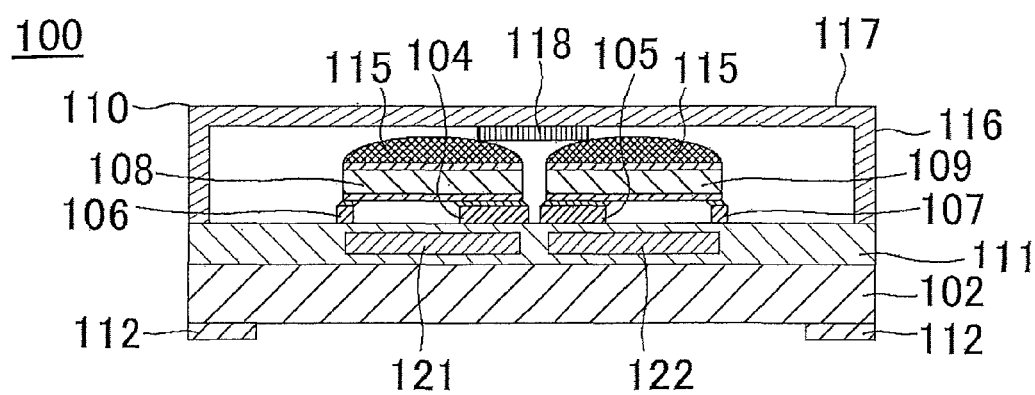

An embodiment of the present invention will be explained below. FIG. 1 (A) is a plan view of short-circuit element 101 and FIG. 1 (B) is a cross-sectional view of the short-circuit element 101. The short-circuit element 101 comprises: an insulating substrate 102; a first heat-generating resistor 121 and a second heat-generating resistor 122 formed on the insulating substrate 102; a first electrode 104 and a second electrode 105 arranged adjacently to each other on the insulating substrate 102; a third electrode 106 arranged adjacently to the first electrode 104 and electrically connected to the first heat-generating resistor 121; a fourth electrode 107 arranged adjacently to the second electrode 105 and electrically connected to the second heat-generating resistor 122; a first meltable conductor 108 arranged between the first and third electrodes 104, 106 to constitute a current path capable of being blown by a heat generated by the first heat-generating resistor 121; and a second meltable conductor 109 arranged between the second and fourth electrodes 105, 107 to constitute a current path capable of being blown by a heat generated by the second heat-generating resistor 122. The short-circuit element 101 also includes a covering member 110 attached to the insulating substrate 102 for internal protection.

The insulating substrate 102 is formed in an approximately rectangular shape by using an insulating material such as alumina, glass ceramics, mullite and zirconia. Other materials used for printed circuit boards such as glass epoxy substrate or phenol substrate may be used as the insulating substrate 102; in these cases, however, the temperature at which the fuses are blown should be considered. The insulating substrate 102 also includes an external terminal 112 formed on the back surface thereof.

The first and second heat-generating resistors 121, 122 are made of a conductive material such as W, Mo and Ru, which has a relatively high resistance and generates a heat when a current flows therethrough. A powdered alloy, composition or compound of these materials is mixed with resin binder to obtain a paste, which is screen-printed as a pattern on the insulating substrate 102 and baked to form the first and second heat-generating resistors 121, 122.

The first and second heat-generating resistors 121, 122 are covered with an insulating layer 111 on the insulating substrate 102. The first and third electrodes 104, 106 are formed on the insulating layer 111 covering the first heat-generating resistor 121 and the second and fourth electrodes 105, 107 are formed on the insulating layer 111 covering the second heat-generating resistor 122. The first electrode 104 is arranged adjacently to and insulated from the second electrode 105 on one side. The third electrode 106 is arranged adjacently to the other side of the first electrode 104. The first electrode 104 and the third electrode 106 are connected by a first meltable conductor 108 to form a current path of the short-circuit element 101. The first electrode 104 also includes a first electrode terminal 104a exposed at a side of the insulating substrate 102. The first electrode terminal 104a is connected to the external terminal 112 formed on the back surface of the insulating substrate 102 via a through hole.

The third electrode 106 is connected to the first heat-generating resistor 121 via a first heat-generating element extracting electrode 123 formed on the insulating substrate 102 or insulating layer 111. The first heat-generating resistor 121 is also connected to a first resistor terminal 121a exposed at a peripheral edge of the insulating substrate 102 via the first heat-generating element extracting electrode 123. The first resistor terminal 121a is connected to the external terminal 112 formed on the back surface of the insulating substrate 102 via a through hole.

The fourth electrode 107 is arranged adjacent to a side of the second electrode 105 which is opposite to the side facing the first electrode 104. The second electrode 105 and the fourth electrode 107 are connected to a second meltable conductor 109. The second electrode 105 is also connected to a second electrode terminal 105a exposed at a side of the insulating substrate 102. The second electrode terminal 105a is connected to the external terminal 112 formed on the back surface of the insulating substrate 102 via a through hole.

The fourth electrode 107 is connected to the second heat-generating resistor 122 via a second heat-generating element extracting electrode 124 formed on the insulating substrate 102 or insulating layer 111. The second heat-generating resistor 122 is also connected to a first resistor terminal 122a exposed at a peripheral edge of the insulating substrate 102 via the second heat-generating element extracting electrode 124. The second resistor terminal 122a is connected to the external terminal 112 formed on the back surface of the insulating substrate 102 via a through hole.

The first to fourth electrodes 104, 105, 106 and 107 may be made of a common electrode material such as Cu and Ag; however, it is preferable that the surfaces of at least the first and second electrodes 104, 105 are coated by using a known plating process including Ni/Au plating, Ni/Pd plating and Ni/Pd/Au plating. This prevents oxidation of the first and second electrodes 104, 105, thus ensuring holding of the meltable conductor. In the case that the short-circuit element 101 is mounted by reflow, this process will prevent the solder connecting the first and second meltable conductors 108, 109 or low melting point metal constituting an outer layer of the first and second meltable conductors 108, 109 from melting and eroding the first and second electrodes 4, 5 (solder erosion) to disconnect them.

Meltable Conductor

The first and second meltable conductors 108, 109 are formed from a low melting point metal, such as Pb free solder consisting essentially of Sn, capable of being promptly melted by a heat of the first and second heat-generating resistors 121, 122.

The first and second meltable conductors 108, 109 may also contain a low melting point metal and a high melting point metal. The low melting point metal is preferably a solder including Pb free solder and the high melting point metal is preferably Ag, Cu or an alloy consisting essentially of these, among others. By containing the low melting point metal and high melting point metal, in the case that the short-circuit element 101 is mounted by reflow, even if the low melting point metal is melted by the reflow temperature exceeding the melting point of the low melting point metal layer, the first and second meltable conductors 108, 109 are not interrupted. These first and second meltable conductors 108, 109 may be formed by depositing a low melting point metal onto a high melting point metal by using a plating method or may be formed by using another laminating method or film-forming method. It should be noted that the first and second meltable conductors 108, 109 can be solder connected to the first and third electrodes 104 and 106 or to second and fourth electrodes 105 and 107 by using a low melting point metal constituting the outer layer.

Alternatively, the first and second meltable conductors 108, 109 may have an inner low melting point metal layer and an outer high melting point metal layer. By using meltable conductors in which the entire surface of the inner low melting point metal layer is covered with the outer high melting point metal layer, even if the melting point of the low melting point metal is lower than reflow temperature, the low melting point metal of the inner layer will not flow out during reflow mounting. Furthermore, in the case of blowout, the low melting point metal of the inner layer melts and erodes the high melting point metal of the outer layer (solder erosion), thus achieving prompt blowout.

Alternatively, the first and second meltable conductors 108, 109 may have a coated structure in which the high melting point metal constitutes an inner layer and the low melting point metal constitutes an outer layer. By using meltable conductors in which the entire surface of the inner high melting point metal layer is covered with the outer low melting point metal layer, the meltable conductors can be connected to electrodes via the outer low melting point metal layer and, in the case of blowout, the low melting point metal melts and erodes the high melting point metal, thus achieving prompt blowout.

Alternatively, the first and second meltable conductors 108, 109 may have a laminated structure in which the low melting point metal and the high melting point metal are laminated. Alternatively, the first and second meltable conductors 108 and 109 may have a multi-layered structure having four or more layers in which the low melting point metal and the high melting point metal are alternately laminated. Alternatively, the first and second meltable conductors 108 and 109 may have a stripe-shaped structure in which the high melting point metal is laminated on a surface of the low melting point metal so as to form a stripe pattern. These structures can also reduce the time of erosion/melting of the high melting point metal by the low melting point metal.

Alternatively, the first and second meltable conductors 108 and 109 may constitute of a high melting point metal having a plurality of openings and a low melting point metal inserted in the openings. This structure increases the area of the high melting point metal layer contacting the melting low melting point metal layer and thus reduces the time in which the low melting point metal layer erodes the high melting point metal layer. It is, therefore, possible to promptly and surely blow the meltable conductor.

In addition, in the first and second meltable conductors 108 and 109, the volume of the low melting point metal preferably is larger than that of the high melting point metal. This can reduce the time of blowout wherein the high melting point metal layer is effectively eroded by the first and second meltable conductors 108, 109.

It should be noted that a flux 115 is applied on the first and second meltable conductors 108, 109 in order to prevent oxidation of the first and second meltable conductors 108, 109 and to improve wettability of the first and second meltable conductors 108, 109 during melting.

The insulating substrate 102 of the short-circuit element 101 is covered by a covering member 110 for internal protection. The covering member 110 includes a side wall 116 constituting a side surface of the short-circuit element 101 and a ceiling 117 constituting a top surface of the short-circuit element 101, the side wall 116 being connected onto the insulating substrate 102 to form a lid member which covers and closes the internal portion of the short-circuit element 101. Similarly to the insulating substrate 102, this covering member 110 is formed of an insulating material such as thermoplastic material, ceramics and glass epoxy substrate Additionally, the covering member 110 may have a covering member electrode 118 formed on the inner surface of the ceiling 117. The covering member electrode 118 is formed at a position overlapping the first and second electrodes 104, 105. This covering member electrode 118 can increase meltable conductor holding capacity because, when the first and second meltable conductors 108, 109 are melted by heat generated by the first and second heat-generating resistors 121, 122, the meltable conductors gathering on the first and second electrodes 104, 105 contact each other and wet-spread.

Short-Circuit Element Circuit

Figure 2A:
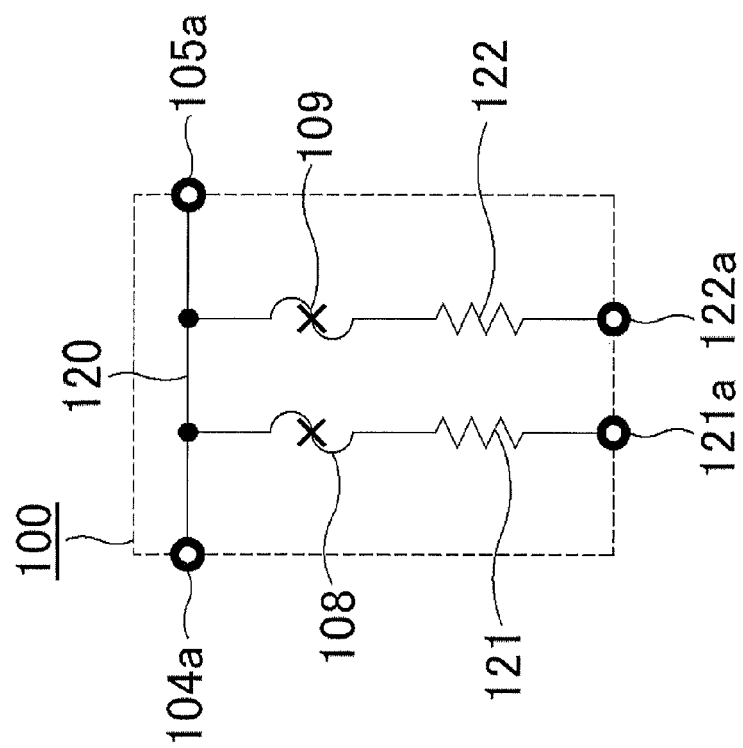
FIG. 2 (A) is a circuit diagram of a short-circuit element in switch-off state and FIG. 2 (B) is a circuit diagram of the short-circuit element in switch-on state.
Figure 2B:
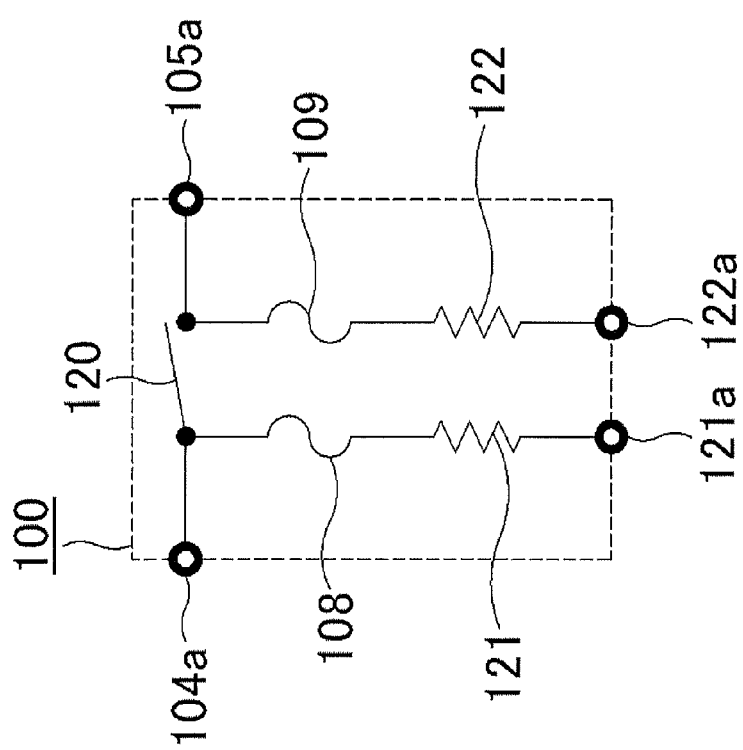

The above-described short-circuit element 101 has a circuit arrangement shown in FIGS. 2 (A) and (B). That is, the short-circuit element 101 constitutes a switch 120 in which the first electrode 104 and the second electrode 105 are normally isolated and when the first and second meltable conductors 108, 109 are melted by a heat generated by the first and second heat-generating resistors 121, 122, the first electrode 104 and the second electrode 105 are short-circuited via the melted conductor (FIG. 2 (B)). The first electrode terminal 104*a* and the second electrode terminal 105*a* constitute both terminals of the switch 120. The first meltable conductor 108 is connected to the first heat-generating resistor 121 via a third electrode 106 and a first heat-generating element extracting electrode 123. Similarly, the second meltable conductor 109 is connected to the second heat-generating resistor 122 via a fourth electrode 107 and a second heat-generating element extracting electrode 124.

As will be described further below, the short-circuit element 101 is incorporated into an electronic appliance and both of the terminals 104*a* and 105*a* of the switch 120 are connected to a current path of the electronic appliance in parallel, forming a bypass current path which can bypass an electronic component by short-circuiting the switch 120, when an abnormality occurs in the electronic component.

In particular, in the case of an abnormality of the electronic component connected to the short-circuit element 101 in parallel, power is supplied to the first and second heat-generating resistors 121, 122 via the first and second resistor terminals 121*a*, 122*a* and first and second heat-generating resistors 121, 122 generate heat. This heat melts the first and second meltable conductors 108, 109, and then the meltable conductors gather on the first and second electrodes 104, 105. Since the first and second electrodes 104, 105 are arranged adjacently to each other, the meltable conductors gathering on the first and second electrodes 104, 105 combine to short-circuit the first and second electrodes 104, 105. Thus, both of the terminals of the switch 120 in the short-circuit element 101 are short-circuited (FIG. 2 (B)).

It should be noted that the current flowing through the first heat-generating resistor 121 is interrupted since the first and third electrodes 104, 106 are disconnected when the first meltable conductor 108 blows, and that the current flowing through the second heat-generating resistor 122 is interrupted since the second and fourth electrodes 105, 107 are disconnected when the second meltable conductor 109 blows.

Antecedent Melting of Second Meltable Conductor

Figure 3A:
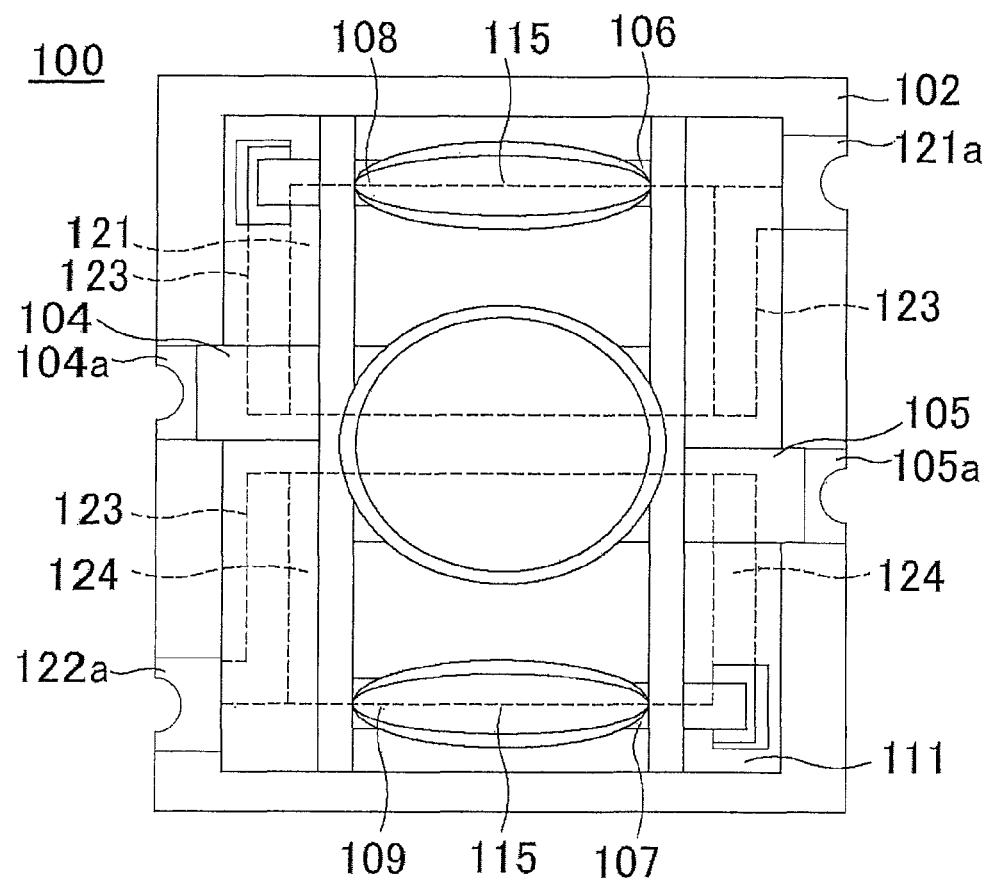
FIG. 3 (A) is a plan view of a short-circuit element in which normally-isolated first and second electrodes are short-circuited by a meltable conductor and FIG. 3 (B) is a cross-sectional view of the same.
Figure 3B:
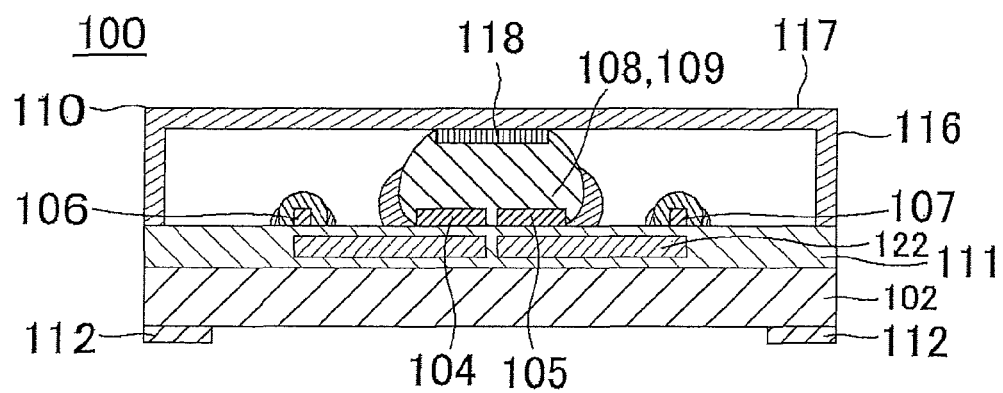
Figure 4:
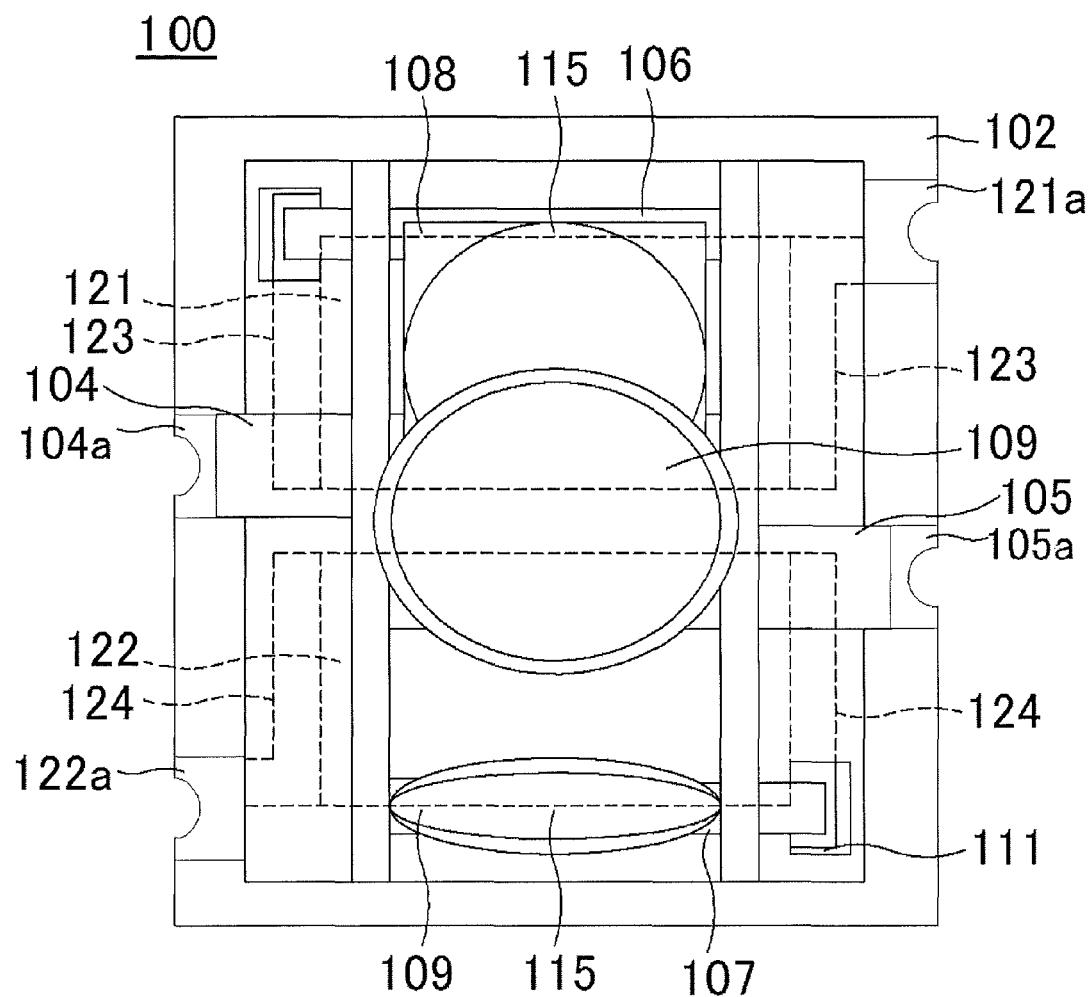
FIG. 4 is a plan view of a short-circuit element illustrating a state in which a second meltable conductor is melted antecedently.

In the short-circuit element 101, it is preferable for the second meltable conductor 109 to melt prior to the first meltable conductor 108. In the short-circuit element 101, since the first heat-generating resistor 121 and the second heat-generating resistor 122 separately generate heat, heating the second heat-generating resistor 122 prior to the first heat-generating resistor 121 by adjusting the timing of power supply, the second meltable conductor 109 can be melted prior to the first meltable conductor 108 easily as shown in FIG. 4, and the meltable conductor of the first and second meltable conductors 108, 109 can gather and combine on the first and second electrodes 104, 105, thus ensuring short-circuiting of the first and second electrodes 104, 105, as shown in FIGS. 3 (A) and (B).

The second meltable conductor 109 of the short-circuit element 101 may be formed to be narrower than the first meltable conductor 108, such that the second meltable conductor 109 melts prior to the first meltable conductor 108. The second meltable conductor 109 formed to be narrower reduces the melting time, thus enabling the second meltable conductor 109 to melt prior to the first meltable conductor 108.

Electrode Area

In addition, in the short-circuit element 101, the area of the first electrode 104 is preferably larger than that of the third electrode 106, and the area of the second electrode 105 is preferably larger than that of the fourth electrode 107. Since the meltable conductor capacity is proportional to the electrode area, by forming the first and second electrodes 104, 105 to be larger than the third and fourth electrodes 106, 107, a larger amount of meltable conductor can gather on the first and second electrodes 104, 105, thus ensuring short-circuiting of the first and second electrodes 104, 105.

Alternative Example of Short-Circuit Element

Figure 5:
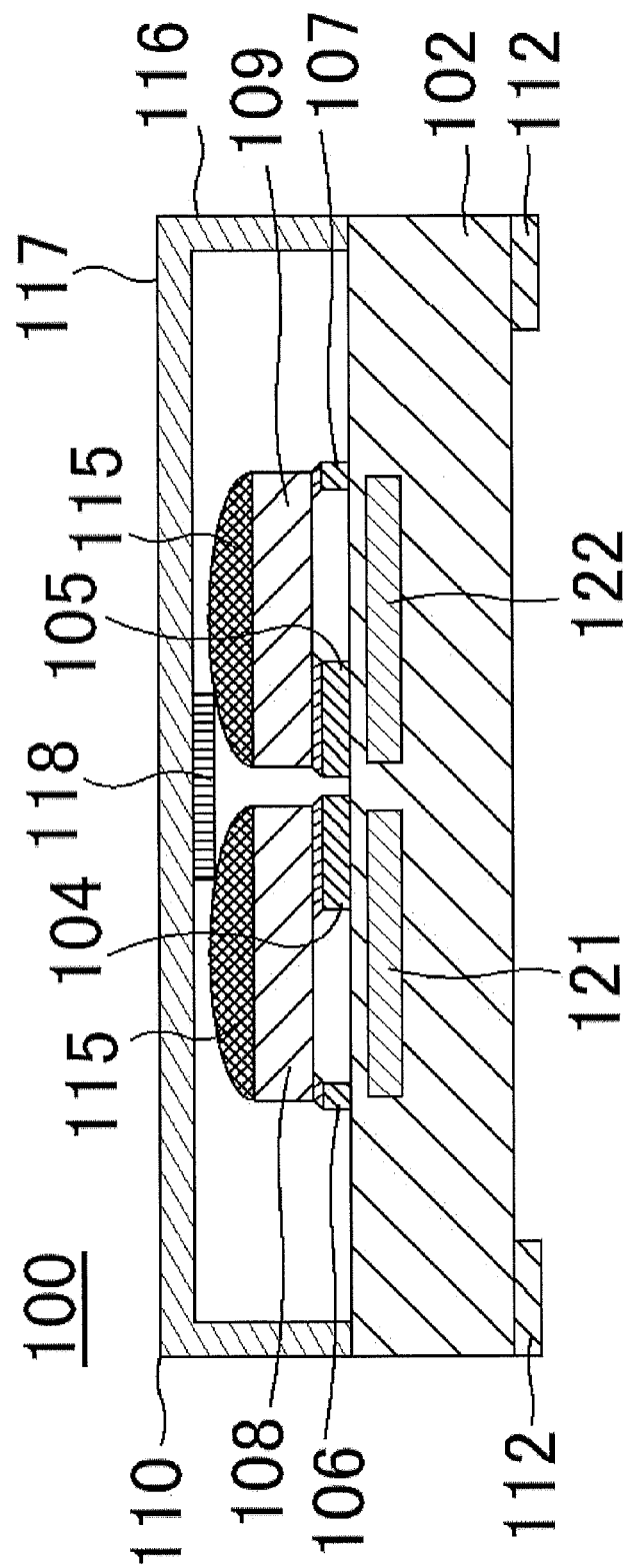
FIG. 5 is a cross-sectional view of an alternative embodiment of the short-circuit element.

In the short-circuit element 101, the first and second heat-generating resistors 121, 122 are not necessarily covered with the insulating layer 11 and the first and second heat-generating resistors 121, 122 may be disposed within the insulating substrate 102 as shown in FIG. 5. By using a material having an excellent heat-conductivity for the insulating substrate 102, the first and second heat-generating resistors 121, 122 can be heated to the same extent/degree as when heating via the insulating layer 111 made from such materials as glass.

Figure 6:
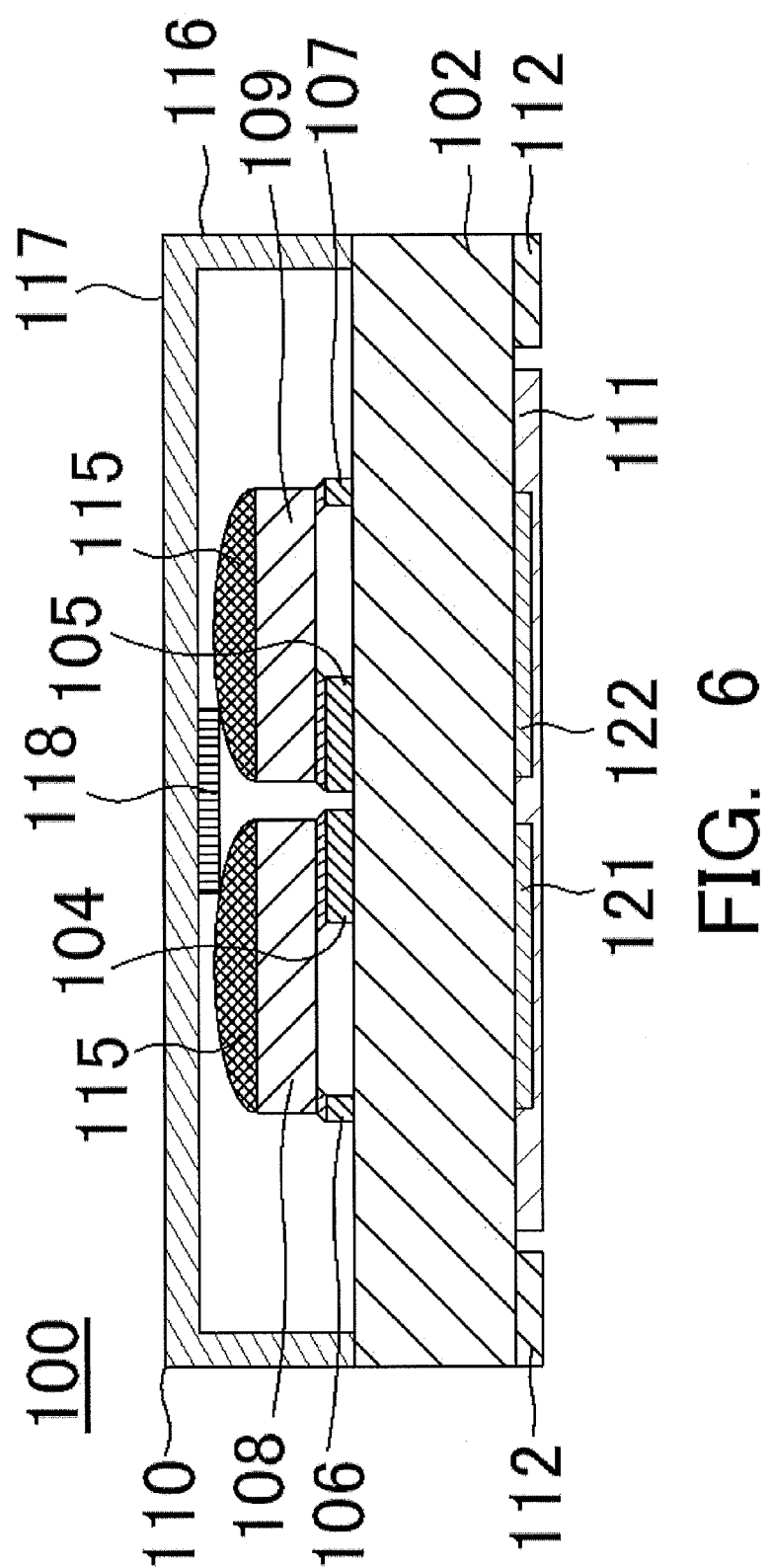
FIG. 6 is a cross-sectional view of an alternative embodiment of the short-circuit element.

Moreover, in the short-circuit element 101, the first and second heat-generating resistors 121, 122 may be formed on the back surface of the insulating substrate 102 opposing the surface on which the first to fourth electrodes 104, 105, 106 and 107 are formed, as shown in FIG. 6. By forming the first and second heat-generating resistors 121, 122 on the back surface of the insulating substrate 102, the forming process can be simplified relative to the case of forming them within the insulating substrate 102. In this case, forming the insulating layer 111 on the first and second heat-generating resistors 121, 122 is preferable so as to protect the resistor and ensure insulation after mounting.

Figure 7:
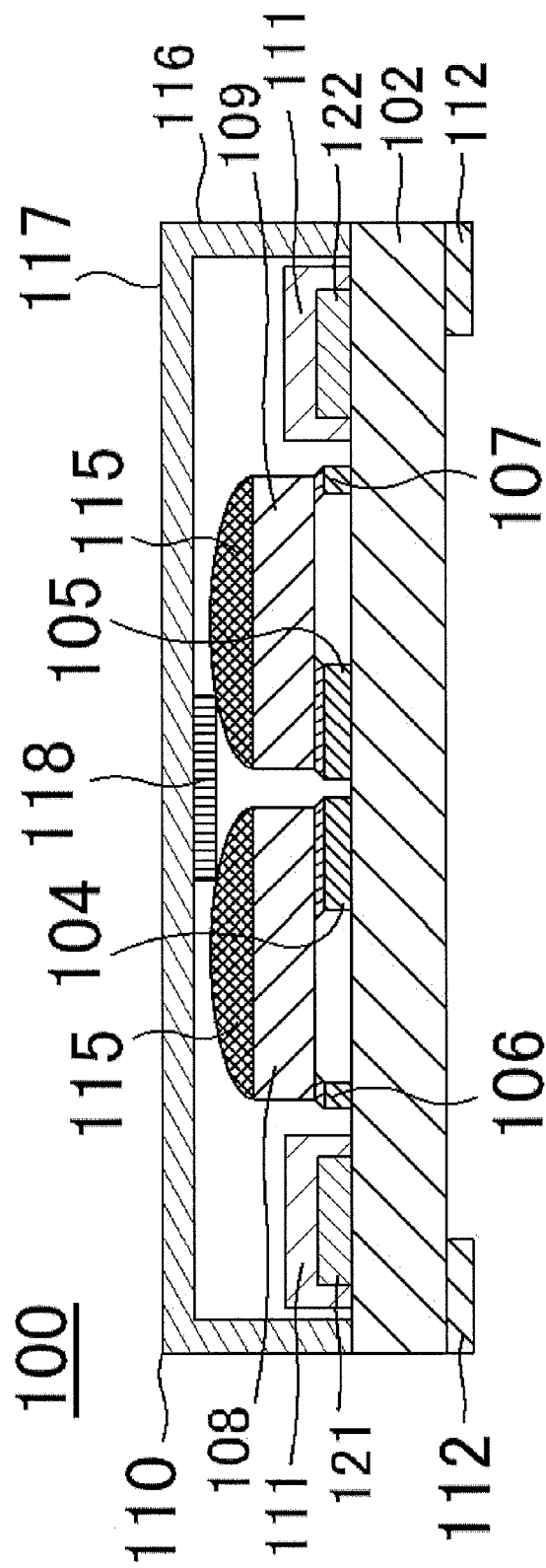
FIG. 7 is a cross-sectional view of an alternative embodiment of the short-circuit element.

In addition, as shown in FIG. 7, the first and second heat-generating resistors 121, 122 of the short-circuit element 101 may be formed on the surface of the insulating substrate 102 on which the first to fourth electrodes 104, 105, 106 and 107 are formed. By forming the first and second heat-generating resistors 121, 122 on this surface of the insulating substrate 102, the forming process can be simplified compared to the case of forming them within the insulating substrate 102. In this case, forming the insulating layer 111 on the first and second heat-generating resistors 121, 122 is also preferable.

In addition, a protective resistor may be provided which is connected to one of the first electrode 104 and the second electrode 105. The protective resistor has a resistance corresponding to an internal resistance of the electronic component connected to the short-circuit elements and lower than the resistance of the heat-generating resistors 121, 122. Current thus flows through the electronic component rather than through the short-circuit element during normal operation of the electronic component.

Figure 8A:
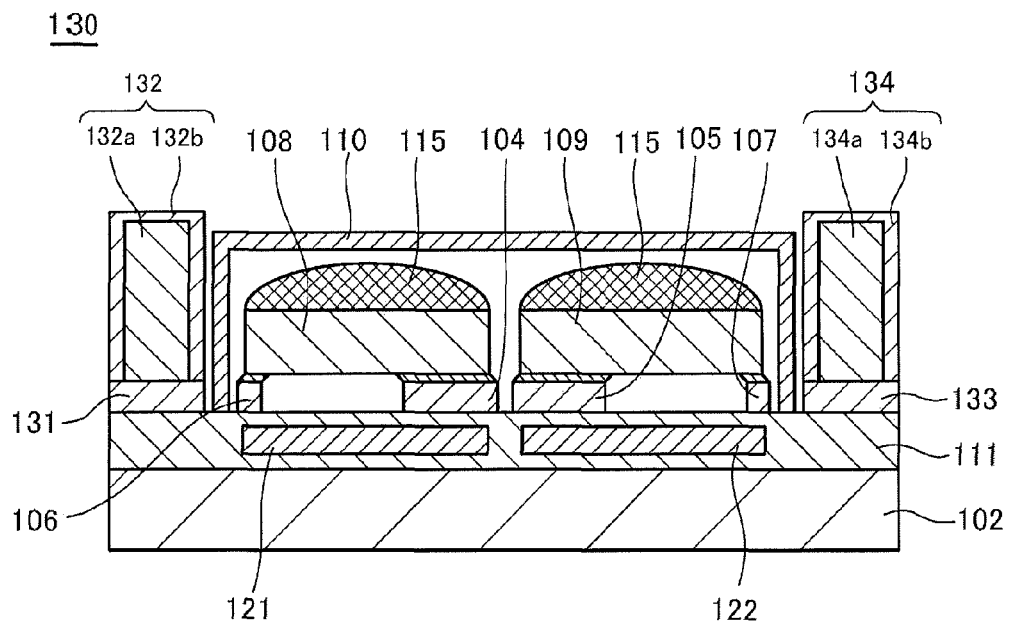
FIG. 8 (A) shows a short-circuit element according to the present invention before melting of the meltable conductor and FIG. 8 (B) shows the same but after melting of the meltable conductor.
Figure 8B:
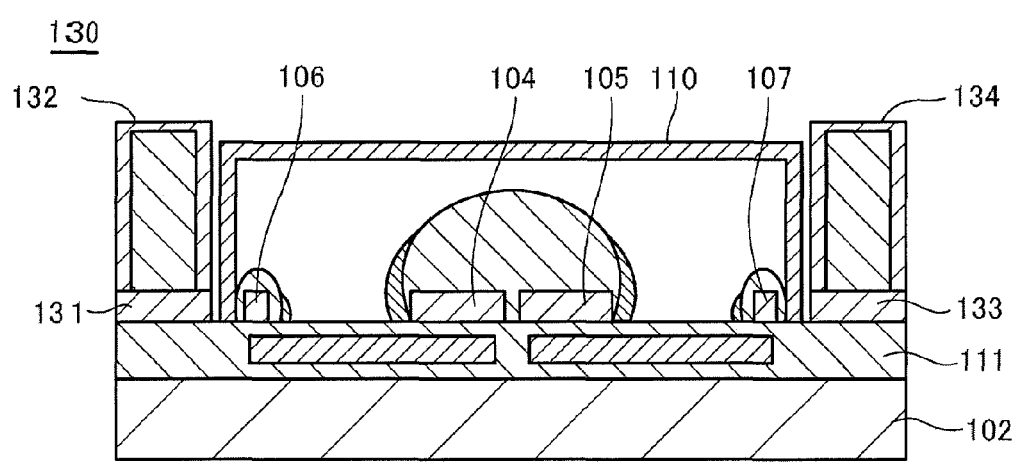

In addition to forming the external terminal 112 connected to the first and second electrodes 104, 105 via the through hole on the back surface of the insulating substrate 102, as is the case of the short-circuit element 130 shown in FIGS. 8 (A) and (B), the short-circuit element according to the present invention may have, on the surface of the insulating substrate 102 on which the first and second electrodes 104, 105 are formed, a first external connecting electrode 131 continuous with the first electrode 104, one or more first external connecting terminals 132 provided on the first external connecting electrode 131, a second external connecting electrode 133 continuous with the second electrode 105, and one or more of the second external connecting terminals 134 provided on the second external connecting electrode 133.

The first and second external connecting electrodes 131, 133 are electrodes for connecting the short-circuit element 130 to the electronic appliance to which the short-circuit element 130 is incorporated, the first external connecting electrode 131 being continuous with first electrode 104 and the second external connecting electrode 133 being continuous with the second electrode 105.

The first and second external connecting electrodes 131, 133 are made of a normal electrode material such as Cu and Ag, and formed on the surface of the insulating substrate 102 on which the first and second electrodes 104, 105 are formed. That is, as shown in FIG. 8, the surface of the short-circuit element 130 on which the first and second meltable conductors 108, 109 are provided will be the mounting surface. It should be noted that the first and second external connecting electrodes 131, 133 can be formed simultaneously with the first and second electrodes 104, 105.

The first external connecting electrode 131 includes a first external connecting terminal 132 formed thereon. Similarly, the second external connecting electrode 133 includes a second external connecting terminal 134 formed thereon. These first and second external connecting terminals 132, 134 are connecting terminals for mounting the short-circuit element onto the electronic appliance and are formed by using a metal bump or metal post. In addition, as shown in FIG. 8 (A), the first and second external connecting terminals 132, 134 have a height exceeding the covering member 110 provided over the insulating substrate 102 and are mountable to a substrate constituting the mounting target of the short-circuit element 130.

It should be noted that the first heat-generating resistor 121 of the short-circuit element 130 includes a resistor connecting terminal 121*b* formed on the first heat-generating element extracting electrode 123 and the resistor terminal 121*a*. On the other hand the second heat-generating resistor 122 of the short-circuit element 130 includes a resistor connecting terminal 122*b* formed on the second heat-generating element extracting electrode 124 and the second resistor terminal 122*a*. The first and second resistor connecting terminals 121*b*, 122*b* are formed by using a metal bump or metal post similarly to the first and second external connecting terminals 132, 134, and protrude upward from the insulating layer 111.

Although the external terminal 112 of the short-circuit element 101 is formed on the back surface of the insulating substrate 102 and is connected to the first and second electrodes 104, 105 via the through hole, the external connecting terminals 132, 134 of the short-circuit element 130 are formed, via the external connecting electrodes 131, 133, on the surface on which the first and second electrodes 104, 105 are formed. In the short-circuit element 130 shown in FIG. 8 (B), the combined resistance of the first external connecting terminal 132 and the second external connecting terminal 134 is lower than the conduction resistance between the first and second external connecting electrodes 131, 133 when the first electrode 104 and the second electrode 105 are short-circuited.

This increases the rated current of the short-circuit element 130 when the first and second electrodes 104, 105 are short-circuited and form a bypass current path such that the short-circuit element 130 can accommodate a large current. Further increase of the rated current of the short-circuit element is desired in large current applications of lithium ion secondary batteries used for a power source of HEVs or EVs. The conduction resistance between the first and second external connecting electrodes 131, 133 short-circuited by the meltable conductor can be reduced to a value (for example, 0.4 ml or less) sufficient to increase the rated current.

However, in the short-circuit element 101, in which the external terminal 112 is formed on the back surface of the insulating substrate 102 and connected to the first and second electrodes 104, 105 via the through hole, the conduction resistance between the first and second electrodes 104, 105 and the external terminal 112 is high (for example, 0.5 to 1.0 mΩ), such that reduction of the entire conduction resistance is limited even if the through hole is filled with a conductor.

In addition, large current flowing between the first and second electrodes 104, 105 and the external terminal 112 having a high resistance generates a heat, which might damage the bypass current path and might thermally affect other peripheral devices.

On the other hand, the external connecting terminals 132, 134 of the short-circuit element 130 are formed on the surface on which the first and second electrodes 104, 105 are formed. The shape and size of the external connecting terminals 132, 134, which are formed on the external connecting electrodes 131, 133, can be designed flexibly, such that terminals having low conduction resistance can be achieved. In the short-circuit element 130, the combined resistance of the first external connecting terminal 131 and the second external connecting terminal 134 is lower than the conduction resistance between the first and second external connecting electrodes 131, 133 when the first electrode 104 and the second electrode 105 are short-circuited.

Consequently, the short-circuit element 130 can easily reduce the conduction resistance beyond the first and second external connecting electrodes 131, 133, which must be high in the case of the short-circuit element 101, thus remarkably improving the current rating.

The first and second external connecting terminals 132, 134 may be formed by using a metal bump or metal post made of Pb free solder consisting essentially of Sn. Any shape of metal bump or metal post may be used. The resistances of the first and second external connecting terminals 132, 134 are determined by the material, shape and size. For example, in the case of a rectangular metal post having a Cu core coated with a solder (Cu core: 0.6 mm×0.6 mm, cross-sectional area: 0.36 mm$^2$, height: 1 mm, specific resistance: 17.2 μmΩ·mm), the resistance of the Cu core of the terminal is approximately 0.048 mΩ and, by taking account of the solder coating, the resistance between the serially connected first and second external connecting terminals 132, 134 is 0.096 mΩ or less, which is sufficiently low to improve the entire rating of the short-circuit element 130.

It should be noted that the conduction resistance between the short-circuited first and second external connecting electrodes 131, 133 of the short-circuit element 130 can be determined by calculating the total resistance of the entire device from the resistance between the short-circuited first and second external connecting terminals 132, 134, and calculating the difference between this total resistance and the known combined resistance of the first and second external connecting terminals 132, 134. The combined resistance of the first and second external connecting terminals 132, 134 of the short-circuit element 130 can be determined by the difference between the measured resistance of the short-circuited first and second external connecting electrodes 131, 133 and the total resistance of the entire device during the short-circuit.

Figure 9:
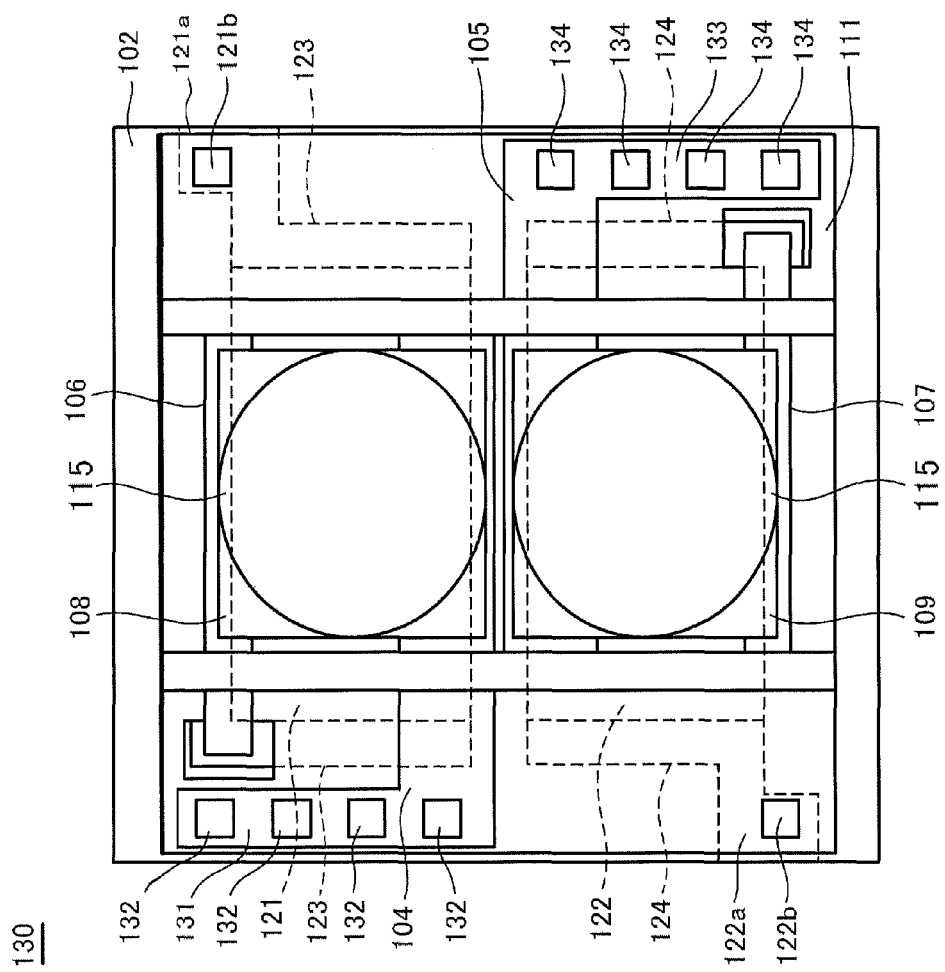
FIG. 9 is a plan view of another short-circuit element according to the present invention.

Furthermore, the conduction resistance of the short-circuit element 130 may be reduced by widening the first and second external connecting electrodes 131, 133 with a rectangular shape, for example, and providing a plurality of the first and second external connecting terminals 132, 134, as shown in FIG. 9. Alternatively, the conduction resistance of the short-circuit element 130 may be reduced by providing the first and second external connecting terminals 132, 134 having a larger diameter on the widened first and second external connecting electrodes 131, 133.

In addition, the first and second external connecting terminals 132, 134 may be formed by coating high melting point metal cores 132a, 134a with low melting point metal layers 132b, 134b. The preferable metal constituting the low melting point metal layer 132b, 134b may be a Pb free solder consisting essentially of Sn, and the high melting point metal 132a, 134a may be an alloy consisting essentially of Cu or Ag.

By coating the high melting point metal 132a, 134a with the low melting point metal layer 132b, 134b, in the case that the short-circuit element 130 is mounted by reflow, even if even if the low melting point metal is melted by the reflow temperature exceeding the melting point of the low melting point metal layer 132b, 134b, the first and second external connecting terminals 132, 134 will not melt. In addition, the first and second external connecting terminals 132, 134 can be connected to the first and second external connecting electrodes 131, 133 by using the low melting point metal constituting the outer layer.

The first and second external connecting terminals 132, 134 can be formed by depositing the low melting point metal onto the high melting point metal 132a, 134a by using a plating method or may be formed by using another conventional laminating method or film forming method.

In addition to forming the first and second external connecting terminals 132, 134 by using a metal bump or metal post, they can be formed as conductive plating layers or conductive layers formed by applying a conductive paste.

The first and second external connecting terminals 132, 134 may be provided in advance on a mounting target onto which the short-circuit element 130 is to be mounted, such that they are connected to the first and second external connecting electrodes 131, 133 or the first and second electrode 104, 105 on a mounting member on which the short-circuit element is mounted.

Circuit Arrangement of Battery Pack

A circuit arrangement of an electronic appliance incorporating the short-circuit element 101 will be explained below. FIG. 10 shows a circuit arrangement of a battery pack 140 incorporating a lithium ion battery installed in and used for various electronic appliances including vehicles and electric power tools. As shown in FIG. 10(A), the battery pack 140 realizes a high voltage and large current by connecting the battery cells 141 in series on the current path. In addition, each battery cell 141 of the battery pack 140 is connected to a protective element 142 so as to interrupt the current path if an abnormality such as over-charging or over-discharging of the relevant battery cell 141 occurs.

Figure 11A:
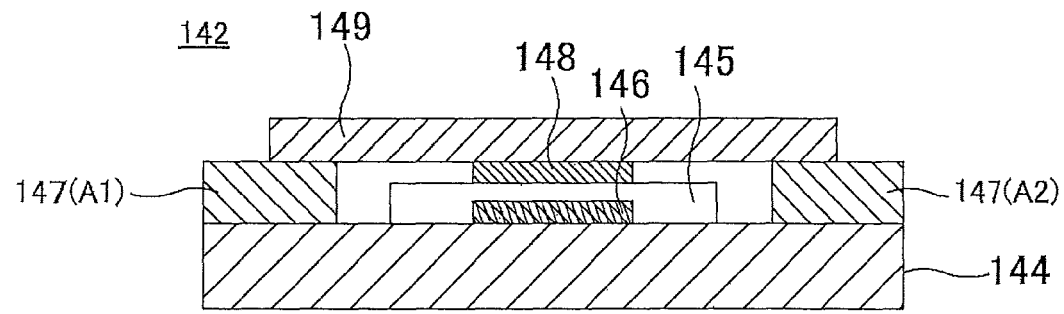
FIG. 11 (A) is a cross-sectional view of a protective element and FIG. 11 (B) is a plan view of the same.
Figure 11B:
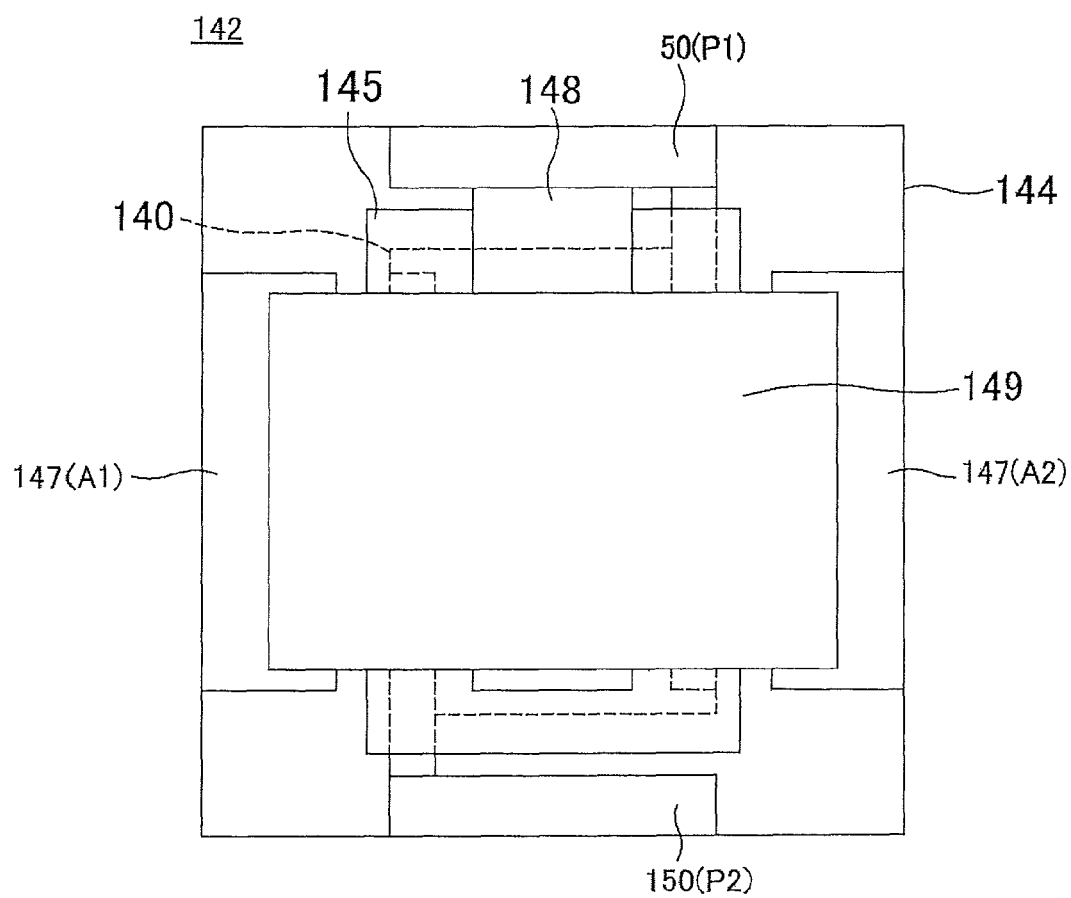

As shown in FIGS. 11 (A) and (B), the protective element 142 includes an insulating substrate 144, a heat-generating resistor 146 laminated on the insulating substrate 144 and covered with an insulating member 145, electrodes 147 (A1), 147 (A2) formed on both of the ends of the insulating substrate 144, a heat-generating element extracting electrode 148 laminated on the insulating member 145 and overlapping the heat-generating resistor 146, and a meltable conductor 149 both ends of which are connected to the electrodes 147 (A1), 147 (A2), respectively, and the central portion of which is connected to the heat-generating element extracting electrode 148.

The insulating substrate 144 is formed in an approximately rectangular shape by using the same material as the above described insulating substrate 102. The heat-generating resistor 146 is formed by using the same material and method for manufacturing the first and second heat-generating resistor 121, 122 described above. In the protective element 142, the insulating member 145 is arranged such that it covers the heat-generating resistor 146, and the heat-generating element extracting electrode 148 is disposed facing the heat-generating resistor 146 via this insulating member 145. The insulating member 145 may be laminated between the heat-generating resistor 146 and the insulating substrate 144 so as to efficiently conduct the heat of the heat-generating resistor 146 to the meltable conductor 149. One end of the heat-generating element extracting electrode 148 is connected to a heat-generating element electrode 150 (P1). The other end of the heat-generating resistor 146 is connected to another heat-generating element electrode 150 (P2). The meltable conductor 149 may be the same as the first and second meltable conductors 108, 109.

It should be noted that, as is the case of the short-circuit element 101, a flux may be applied on almost the entire surface of the meltable conductor 149 of the so protective element 142 in order to prevent oxidation of the meltable conductor 149. Moreover, the protective element 142 may include a covering member over the insulating substrate 144 for internal protection.

Figure 12:
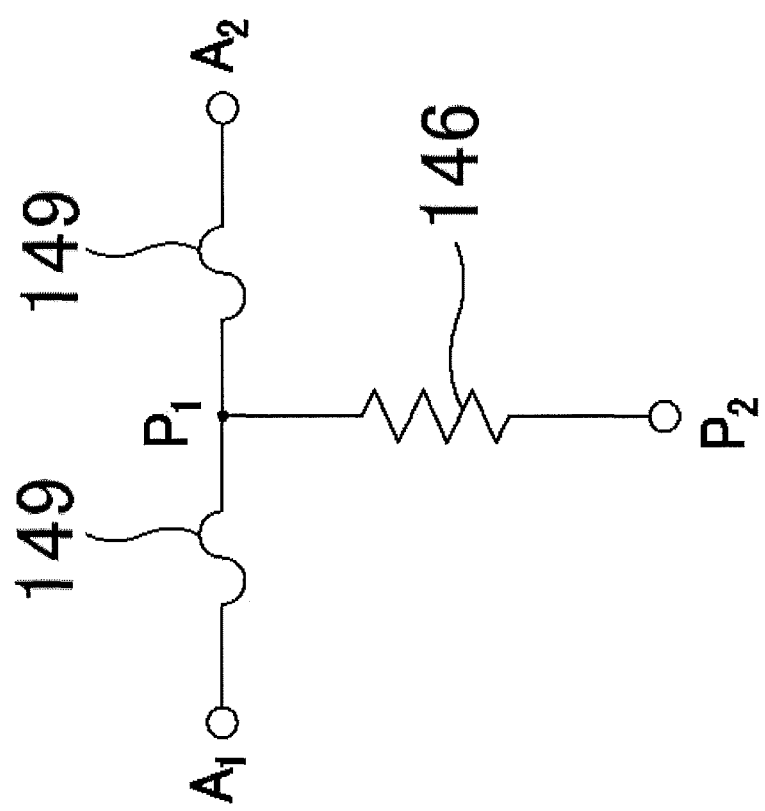
FIG. 12 is a circuit diagram of a protective element.

FIG. 12 shows a circuit arrangement of the protective element 142. As shown, the circuit arrangement of the protective element 142 includes the meltable conductor 149 serially connected via the heat-generating element extracting electrode 148, and the heat-generating resistor 146 through which a current is supplied via the connection point of the meltable conductor 149 to generate heat to melt the meltable conductor 149. One of the two electrodes 147 of the protective element 142 is connected to A1 and the other is connected to A2. In addition, the heat-generating element extracting electrode 148 and the heat-generating element electrode 150 connected thereto are connected to P1 and the other heat-generating element electrode 150 is connected to P2.

The protective element 142 may be used in a circuit of a battery pack 140 of a lithium ion secondary battery, as shown FIG. 10 (A). The battery pack 140 includes a plurality of battery units 184 connected in series. Each battery unit 184 includes a battery cell 141, a protective element 142, a short-circuit element 101, a first current controlling element 181 for controlling the operation of the protective element 142, second and third current controlling elements 182, 183 for controlling the operation of the short-circuit element 101, and a protective resistor 154.

In addition, the battery pack 140 includes a battery unit 184, a charging/discharging controlling circuit 155 for controlling the charging/discharging of the battery unit 184, and a detecting circuit 156 for detecting the voltage of the battery cell 141 of each battery unit 184 and outputting an abnormal signal to the first to third current controlling elements 181 to 183 which control the operation of the protective element 142 or the short-circuit element 101.

In each battery unit 184, the electrode 147 (A1) of the protective element 142 is connected to the battery cell 141 in series, and the electrode 147 (A2) is connected to the charging/discharging current path of the battery pack 140. Furthermore, in the battery unit 184, the second electrode terminal 105a of the short-circuit element 101 is connected to the open end of the protective element 142 via the protective resistor 154, and the first electrode terminal 104a is connected to the open end of the battery cell 141, such that the protective element 142 and battery cell 141, and the short-circuit element 101 are connected in parallel. Moreover, in the battery unit 184, the heat-generating element electrode 150 (P2) of the protective element 142 is connected to the first current controlling element 152 and the second resistor terminal 122a of the short-circuit element 101 is connected to the second current controlling element 183.

The detecting circuit 156 is connected to each battery cell 141 to detect the voltage value of each battery cell 141 and supplies the detected voltage value to a controlling component 159 of the charging/discharging controlling circuit 155. Furthermore, when an over-charging voltage or over-discharging voltage is detected in a battery cell 141, the detecting circuit 156 outputs an abnormal signal to the first to third current controlling elements 181 to 183 of the battery unit 184 including the relevant battery cell 141.

When the detection signal output from the detecting circuit 156 indicates a voltage exceeding the predetermined threshold value corresponding to over-discharging or over-charging of the battery cell 141, the first to third current controlling elements 181 to 183, which are formed, for example, of an FET control the protective element 142 and the short-circuit element 101 to interrupt the charging/discharging current path of the battery unit 184 without the switching operation of the third and fourth current controlling elements 157, 158, to short-circuit the switch 120 of the short-circuit element 101 to form a bypass current path which bypasses the relevant battery unit 184.

In normal operation of the battery pack 140, the switch 120 of the short-circuit element 101 is not short-circuited and the current E flows through the protective element 142 and the battery cell 141, as shown in FIG. 10 (A).

If an abnormal voltage is detected from the battery cell 141, the detecting circuit 156 outputs an abnormal signal to the first current controlling element 181 and the heat-generating resistor 146 of the protective element 142 generates heat. As shown in FIG. 10 (B), the heat-generating resistor 146 of the protective element 142 heats and melts the meltable conductor 149 to interrupt the connection between the electrodes 147 (A1) and 147 (A2). This can bypass the relevant battery unit 184 having the abnormal battery cell 141 from the charging/discharging current path of the battery pack 140. It should be noted that the blowout of the meltable conductor 149 interrupts the current supplied to the heat-generating resistor 146.

Next, the detecting circuit 156 of the battery pack 140 also outputs an abnormal signal to the second current controlling element 182 of the relevant battery unit 184 such that the first heat-generating resistor 121 of the short-circuit element 101 also generates heat. As shown in FIG. 10 (C), the first heat-generating resistor 121 of the short-circuit element 101 heats and melts the first meltable conductor 108 and the melted conductor gathers on the first electrode 104. Next to the output to the second current controlling element 182, the battery pack 140 outputs abnormal signal to the third current controlling element 183 such that the second heat-generating resistor 122 generates heat. The second heat-generating resistor 122 of the short-circuit element 101 heats and melts the second meltable conductor 109 and the melted conductor gathers on the second electrode 105.

Consequently, as shown in FIG. 10 (D), the first electrode terminal 104a and the second electrode terminal 105a of the switch 120 of the battery pack 140 is short-circuited and a bypass current path bypassing the relevant battery unit 184 can be formed. It should be noted that the blowout of the first and second meltable conductors 108, 109 interrupts the current supplied to the first and second heat-generating resistors 121, 122.

It should be noted that setting the resistance of the protective resistor 154 to a value approximately the same as the internal resistance of the battery cell 141 can enable a bypass current having approximately the same as normal operating capacity.

In this battery pack 140, even if an abnormality occurs in one of the battery units 184, a bypass current path bypassing the damaged battery unit 184 can be formed to retain the charging/discharging function by the remaining normal battery units 184.

Short-Circuit Element (Incorporating Protective Resistor)

Figure 13:
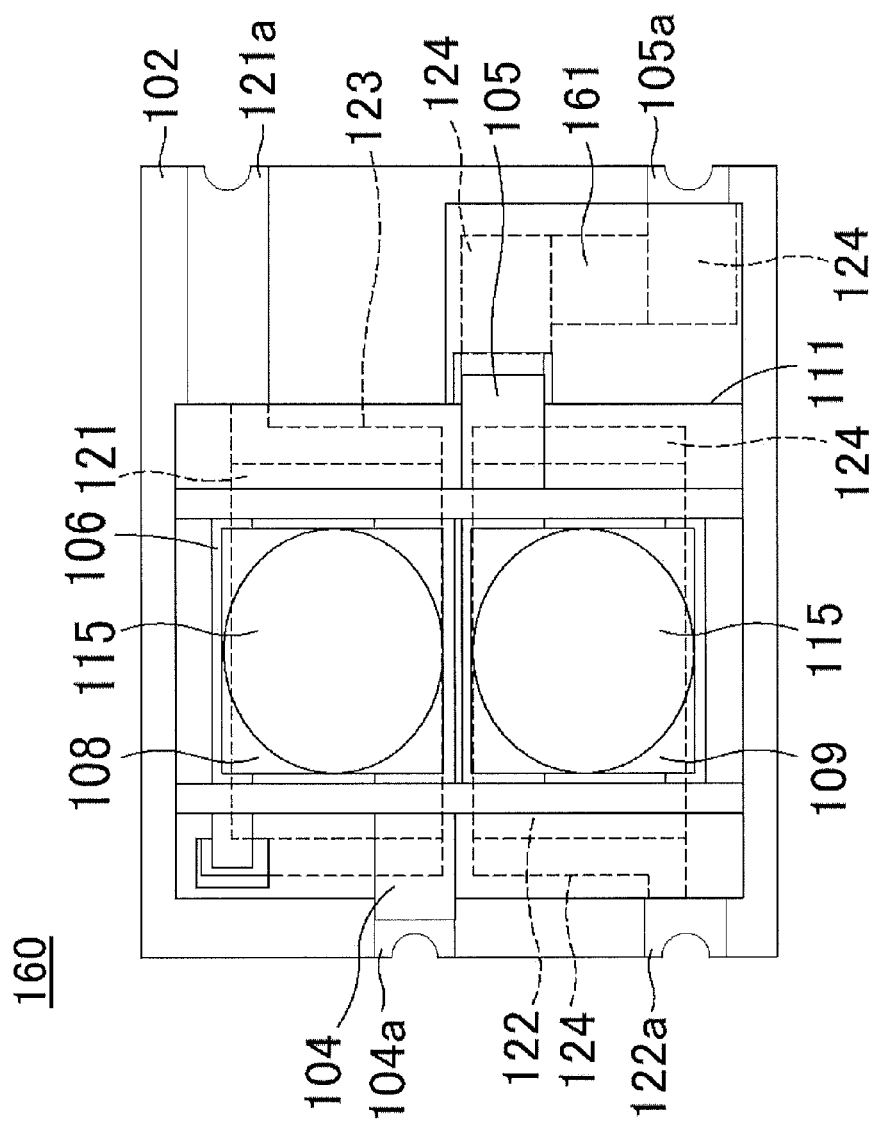
FIG. 13 is a plan view of a short-circuit element including a protective resistor.

A protective resistor may be incorporated into the short-circuit element in advance. FIG. 13 is a plan view of a short-circuit element 160 in which a protective resistor 161 is formed on the insulating substrate 102. In addition to the constitution of the above-described short-circuit element 101, in the short-circuit element 160, the protective resistor 161 is connected to the second electrode 105, and a second electrode terminal 105a is formed on this protective resistor 161. The protective resistor 161 can use the same material and be simultaneously formed with the same process as the heat-generating resistor 121, 122.

In the cases that the internal resistance of an electronic appliance or the battery pack is fixed and known, the short-circuit element 160 incorporating the protective resistor 161 in advance can be used to simplify processes such as mounting.

Figure 14B:
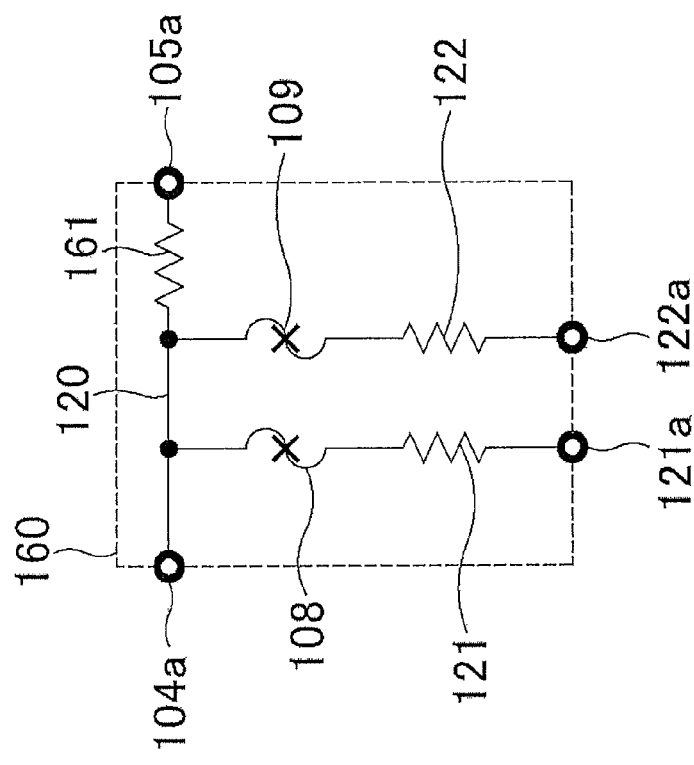
FIG. 14 (A) is a circuit diagram of a short-circuit element including a protective resistor in switch-off state and FIG. 14 (B) is a circuit diagram of the same in switch-on state.
Figure 14A:
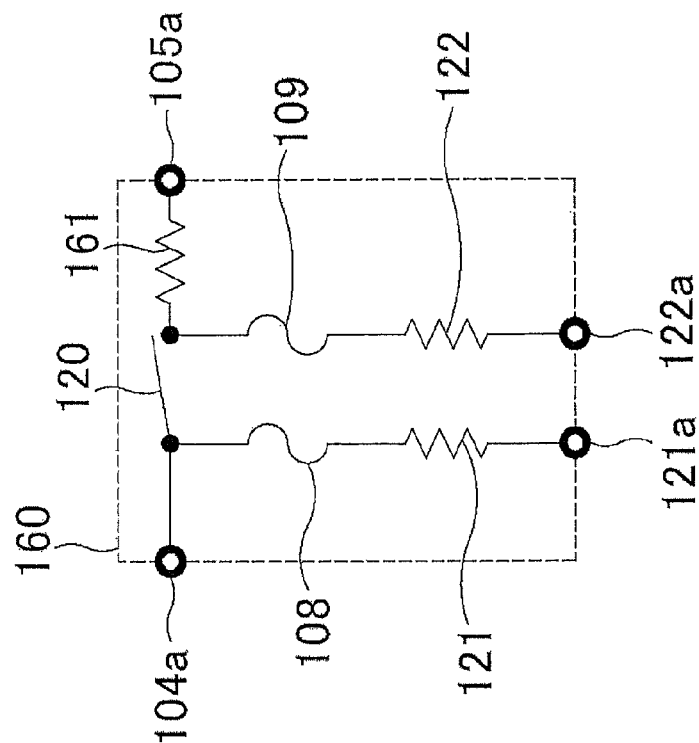

FIGS. 14 (A) and (B) illustrate a circuit arrangement of the short-circuit element 160. In this circuit arrangement of the short-circuit element 160, when the switch 120 is short-circuited, the first electrode terminal 104a and the second electrode terminal 105a are connected via the protective resistor 161. That is, the circuit arrangement of the short-circuit element 160 includes the first and second meltable conductors (fuses) 108, 109, the first and second heat-generating resistors 121, 122 connected to one end of the first and second meltable conductors 108, 109, the switch 120 connected to the other end of the first and second meltable conductors 108, 109, to which the first and second heat-generating resistors 121, 122 are not connected, and the protective resistor 161 connected to at least one terminal of the switch 120, wherein the switch 120 is short-circuited in conjunction with melting of the first and second meltable conductors 108, 109.

Similarly to the above-described short-circuit element 130, in the short-circuit element 160L, other than forming the external terminal 112 on the back surface of the insulating substrate 102 and connecting the external terminal 112 to the first electrode terminal 104a and the second electrode terminal 105a via a through hole, the second external connecting electrode 133 continuous with the second electrode 105, and the second external connecting terminal 134 may be formed on the surface of the insulating substrate 102 on which the first and second electrodes 104, 105 are formed, via the first external connecting electrode 131 continuous with the first electrode 104, the first external connecting terminal 132 and the protective resistor 161.

Circuit Arrangement of Battery Pack (Incorporating Protective Resistor)

Figure 15:
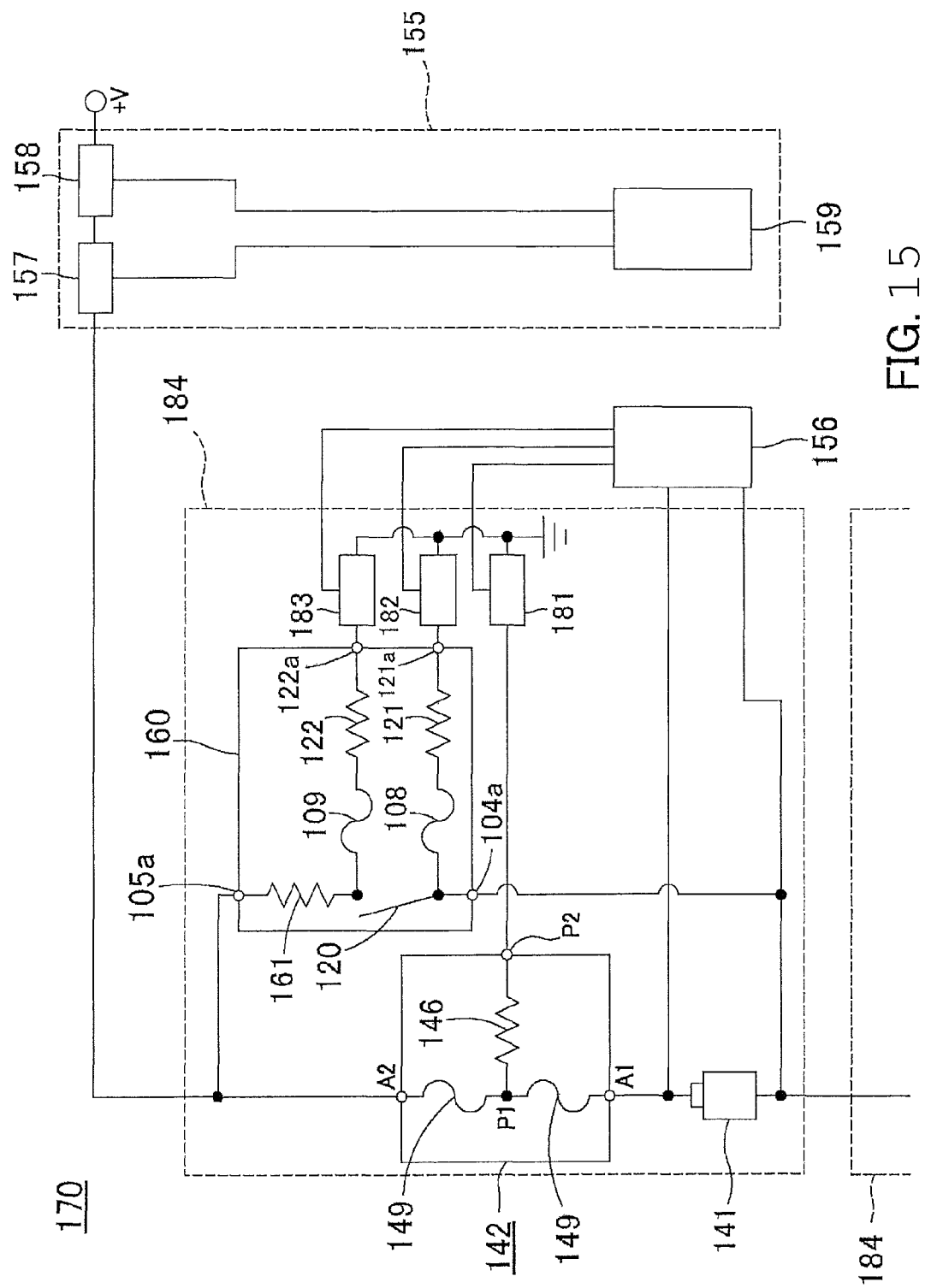
FIG. 15 is a circuit diagram of a battery pack using a short-circuit element including a protective resistor.

FIG. 15 shows a circuit arrangement of a battery pack 170 incorporating the short-circuit element 160. The circuit arrangement of the battery pack 170 is the same as the above-described battery pack 140 except that the short-circuit element 160 is used. That is, the circuit arrangement of the battery pack 170 includes the above-described short-circuit element 160, the battery cell 141, the protective element 142 connected in a current path of the battery cell 141, which interrupts current flowing to the battery cell 141 in the case of an electric signal, the detecting circuit 156 which detects an abnormality of the battery cell 141 and outputs an abnormal signal, and the first to third current controlling elements 181, 182 and 183, which operate in accordance with the abnormal signal from the detecting circuit 156, wherein both terminals of the battery cell 141 and the protective element 142 are connected to the terminal 104a of the switch 120 connected to the meltable conductors 108, 109 and the open terminal 105a of the protective resistor 161 in parallel, the first and second resistor terminals 121a, 122a of the first and second heat-generating resistor 121, 122 are connected to the second and third current controlling element 182, 183, and heat-generating element electrode 150 (P2) as an input terminal for the electric signal of the protective element 142 is connected to the first current controlling element 181, and in an abnormal situation of the battery cell 141, the first to third current controlling elements 181, 182 and 183 operate in accordance with an abnormal signal from the detecting circuit 156, to disconnect the current path of the battery cell 141 with protective element 142 and to short-circuit the switch 120 in conjunction with melting of the meltable conductors 108, 109 to form a bypass current path. In the battery pack 170, the resistance of the protective resistor 161 of the short-circuit element 160 provided in each battery unit 184 is almost the same as the internal resistance of the battery cell 141 of the relevant battery unit 184.

In this battery pack 170, even if an abnormality occurs in one of the battery units 184, a bypass current path bypassing the damaged battery unit 184 can be formed to retain the charging/discharging function by the remaining normal battery units 184. In this situation, since the resistance of the protective resistor 161 of the battery pack 170 is almost the same as the internal resistance of the battery cell 141, the current flowing through the bypass current path will be almost the same as the normal operating current.

Circuit Arrangement of Battery Pack (with Controlling Element Shared)

Figure 16:
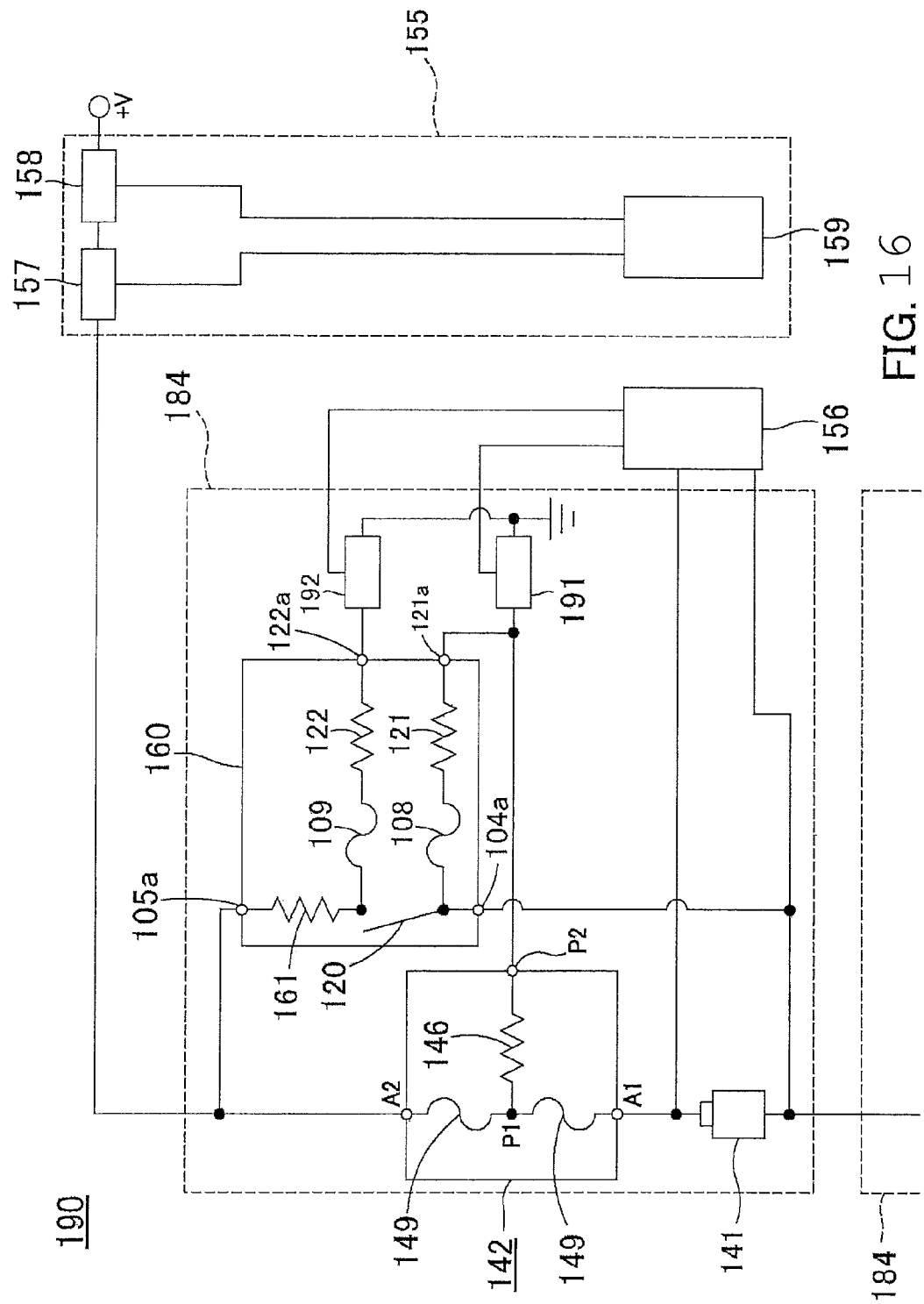
FIG. 16 is a circuit diagram of an alternative embodiment of a battery pack using a short-circuit element including a protective resistor.

FIG. 16 shows a battery pack 190 incorporating the short-circuit element 160 wherein, among the first to third current controlling elements, the current controlling element connected to the protective element 142 and the current controlling element connected to the first resistor terminal 121a are shared. That is, as shown in FIG. 16, in the battery pack 190, the heat-generating element electrode 150 (P2) of the protective element 142 and the first resistor terminal 121a of the short-circuit element 160 are connected to the first current controlling element 191, and the second resistor terminal 122a of the short-circuit element 160 is connected to the second current controlling element 192. The first and second current controlling element 191, 192 are connected to the detecting circuit 156 and the detecting circuit 156 detects over-charging voltage or over-discharging voltage of the battery cell 141 and outputs an abnormal signal.

When the detection signal output from the detecting circuit 156 indicates a voltage exceeding the predetermined threshold value corresponding to over-discharging or over-charging of the battery cell 141, the first and second current controlling elements 191, 192 which are formed, for example, of an FET activate the operation of the protective element 142 and the short-circuit element 160.

In this situation, the detecting circuit 156 firstly outputs an abnormal signal to the first current controlling element 191 and then outputs an abnormal signal to the second current controlling element 192. Upon receiving the abnormal signal, the first current controlling element 191 supplies electric power to the heat-generating resistor 146 of protective element 142 and the first heat-generating resistor 121 of the short-circuit element 160 such that they generate heat. The battery pack 190) thus blows the meltable conductor 149 of the protective element 142 to interrupt the charging/discharging current path of the battery unit 184 and melts the first meltable conductor 108 of the short-circuit element 160. Subsequently, upon receiving the abnormal signal, the second current controlling element 192 supplies electric power to the second heat-generating resistor 122 of the short-circuit element 160 such that it generates heat. Consequently, in this battery pack 190, the second meltable conductor 109 of the short-circuit element 160 melts and combines with the first meltable conductor 108 melted in advance, and the combined conductor gathers on the first and second electrode 104, 105. The short-circuit element 160 thus short-circuits the switch 120 to form a bypass current path bypassing the relevant battery unit 184. The battery pack 190 advantageously reduces the number of the current controlling elements and simplifies the circuit arrangement.

REFERENCE SIGNS LIST 101 short-circuit element, 102 insulating substrate, 104 first electrode, 104a first electrode terminal, 105 second electrode, 105a second electrode terminal, 106 third electrode, 107 fourth electrode, 108 first meltable conductor, 109 second meltable conductor, 110 covering member, 111 insulating layer, 112 external terminal, 115 flux, 118 covering member electrode, 120 switch. 121 first heat-generating resistor, 121a first resistor terminal, 121b first resistor connecting terminal, 122 second heat-generating resistor, 122a second resistor terminal, 122b second resistor connecting terminal, 123 first heat-generating element extracting electrode, 124 first heat-generating element extracting electrode, 130 short-circuit element, 131 first external connecting electrode, 132 first external connecting terminal, 133 second external connecting electrode, 134 second external connecting terminal, 140 battery pack, 141 battery cell, 142 protective element, 144 insulating substrate, 145 insulating member, 146 heat-generating resistor, 147 electrode, 148 heat-generating element extracting electrode, 149 meltable conductor. 150 heat-generating element electrode, 154 protective resistor, 155 charging/discharging controlling circuit, 156 detecting circuit, 157 third current controlling element, 158 fourth current controlling element, 159 controlling component, 160 short-circuit element, 161 protective resistor, 170 battery pack, 181 first current controlling element, 182 second current controlling element, 183 third current controlling element, 184 battery unit, 190 battery pack, 191 first current controlling element, 192 second current controlling element

The invention claimed is:
1. A short-circuit element comprising:
an insulating substrate;
a first and a second heat-generating resistors formed on the insulating substrate;
a first and a second electrodes arranged adjacently to each other on the insulating substrate;
a third electrode arranged adjacently to the first electrode on the insulating substrate and electrically connected to the first heat-generating resistor;
a fourth electrode arranged adjacently to the second electrode on the insulating substrate and electrically connected to the second heat-generating resistor;
a first meltable conductor arranged between the first and third electrodes to constitute a current path capable of being blown by a heat generated by the first heat-generating resistor; and
a second meltable conductor arranged between the second and fourth electrodes to constitute a current path capable of being blown by a heat generated by the second heat-generating resistor,
wherein the first and second meltable conductors are melted by the heat from the first and second heat-generating resistors and gather on the first and second electrodes to short-circuit the first and second electrodes.

2. The short-circuit element according to claim 1, wherein one of the first and second meltable conductors is blown prior to the other.

3. The short-circuit element according to claim 2 further comprising an insulating layer laminated on the insulating substrate,
wherein the first to fourth electrodes are arranged on the insulating layer, and
wherein the first and second heat-generating resistors are disposed within the insulating layer or between the insulating layer and the insulating substrate.

4. The short-circuit element according to claim 2, wherein the first and second heat-generating resistors are disposed within the insulating substrate.

5. The short-circuit element according to claim 2, wherein the first and second heat-generating resistors are disposed on a surface of the insulating substrate opposite to an electrode-forming surface.

6. The short-circuit element according to claim 2, wherein the first and second heat-generating resistors are disposed on an electrode-forming surface of the insulating substrate.

7. The short-circuit element according to claim 2, wherein surfaces of the first electrode and the second electrode are coated with one of Ni/Au plating, Ni/Pd plating and Ni/Pd/Au plating.

8. The short-circuit element according to claim 2, wherein the first electrode has an area wider than that of the third electrode, and the second electrode has an area wider than that of the fourth electrode.

9. The short-circuit element according to claim 2 further comprising:
a covering member arranged on the insulating substrate for internal protection; and
a covering member electrode arranged on an inner surface of the covering member,
wherein the covering member electrode is arranged at a position which overlaps the first electrode and the second electrode.

10. The short-circuit element according to claim 2 further comprising a protective resistor arranged on the insulating substrate and connected to one of the first electrode and the second electrode.

11. The short-circuit element according to claim 2, wherein the first and second meltable conductors are a Pb free solder consisting essentially of Sn.

12. The short-circuit element according to claim 2,
wherein the first and second meltable conductors contain a low melting point metal and a high melting point metal, and
wherein the low melting point metal is melted by a heat generated by the heat-generating resistor and erodes the high melting point metal.

13. The short-circuit element according to claim 12, wherein the low melting point metal is a solder, and wherein the high melting point metal is Ag, Cu or an alloy consisting essentially of Ag or Cu.

14. The short-circuit element according to claim 12, wherein the first and second meltable conductors have a coated structure in which the low melting point metal constitutes an inner layer and the high melting point metal constitutes an outer layer.

15. The short-circuit element according to claim 12, wherein the first and second meltable conductors have a coated structure in which the high melting point metal constitutes an inner layer and the low melting point metal constitutes an outer layer.

16. The short-circuit element according to claim 12, wherein the first and second meltable conductors have a laminated structure in which the low melting point metal and the high melting point metal are laminated.

17. The short-circuit element according to claim 12, wherein the first and second meltable conductors have a multi-layered structure having four or more layers in which the low melting point metal and the high melting point metal are alternately laminated.

18. The short-circuit element according to claim 12, wherein the first and second meltable conductors have a stripe-shaped structure in which the high melting point metal partially overlaps a surface of the low melting point metal.

19. The short-circuit element according to claim 12, wherein the first and second meltable conductors are constituted of a high melting point metal having a plurality of openings and a low melting point metal inserted in the openings.

20. The short-circuit element according to claim 12, wherein, in the first and second meltable conductors, the volume of the low melting point metal is larger than that of the high melting point metal.

21. The short-circuit element according to claim 2,
wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

22. The short-circuit element according to claim 21, wherein the external connecting terminal is one of a metal bump and a metal post.

23. The short-circuit element according to claim 22, wherein in the metal bump or metal post, a low melting point metal layer is formed on a high melting point metal surface.

24. The short-circuit element according to claim 23, wherein the high melting point metal consists essentially of copper or silver, and the low melting point metal is a lead-free solder consisting essentially of tin.

25. The short-circuit element according to claim 21, wherein the external connecting terminal is a metal bump made of a lead-free solder consisting essentially of tin.

26. The short-circuit element according to claim 2, wherein one of the first and second meltable conductors is narrower than the other such that the narrower one is blown prior to the other.

27. The short-circuit element according to claim 26 further comprising an insulating layer laminated on the insulating substrate,
wherein the first to fourth electrodes are arranged on the insulating layer, and
wherein the first and second heat-generating resistors are disposed within the insulating layer or between the insulating layer and the insulating substrate.

28. The short-circuit element according to claim 26, wherein the first and second heat-generating resistors are disposed within the insulating substrate.

29. The short-circuit element according to claim 26, wherein the first and second heat-generating resistors are disposed on a surface of the insulating substrate opposite to an electrode-forming surface.

30. The short-circuit element according to claim 26, wherein the first and second heat-generating resistors are disposed on an electrode-forming surface of the insulating substrate.

31. The short-circuit element according to claim 26, wherein surfaces of the first electrode and the second electrode are coated with one of Ni/Au plating, Ni/Pd plating and Ni/Pd/Au plating.

32. The short-circuit element according to claim 26, wherein the first electrode has an area wider than that of the third electrode, and the second electrode has an area wider than that of the fourth electrode.

33. The short-circuit element according to claim 26 further comprising:
a covering member arranged on the insulating substrate for internal protection; and
a covering member electrode arranged on an inner surface of the covering member,
wherein the covering member electrode is arranged at a position which overlaps the first electrode and the second electrode.

34. The short-circuit element according to claim 26 further comprising a protective resistor arranged on the insulating substrate and connected to one of the first electrode and the second electrode.

35. The short-circuit element according to claim 26, wherein the first and second meltable conductors are a Pb free solder consisting essentially of Sn.

36. The short-circuit element according to claim 26,
wherein the first and second meltable conductors contain a low melting point metal and a high melting point metal, and
wherein the low melting point metal is melted by a heat generated by the heat-generating resistor and erodes the high melting point metal.

37. The short-circuit element according to claim 36,
wherein the low melting point metal is a solder, and
wherein the high melting point metal is Ag, Cu or an alloy consisting essentially of Ag or Cu.

38. The short-circuit element according to claim 36, wherein the first and second meltable conductors have a coated structure in which the low melting point metal constitutes an inner layer and the high melting point metal constitutes an outer layer.

39. The short-circuit element according to claim 36, wherein the first and second meltable conductors have a coated structure in which the high melting point metal constitutes an inner layer and the low melting point metal constitutes an outer layer.

40. The short-circuit element according to claim 36, wherein the first and second meltable conductors have a laminated structure in which the low melting point metal and the high melting point metal are laminated.

41. The short-circuit element according to claim 36, wherein the first and second meltable conductors have a multi-layered structure having four or more layers in which the low melting point metal and the high melting point metal are alternately laminated.

42. The short-circuit element according to claim 36, wherein the first and second meltable conductors have a stripe-shaped structure in which the high melting point metal partially overlaps a surface of the low melting point metal.

43. The short-circuit element according to claim 36, wherein the first and second meltable conductors are constituted of a high melting point metal having a plurality of openings and a low melting point metal inserted in the openings.

44. The short-circuit element according to claim 36, wherein, in the first and second meltable conductors, the volume of the low melting point metal is larger than that of the high melting point metal.

45. The short-circuit element according to claim 26, wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

46. The short-circuit element according to claim 45, wherein the external connecting terminal is one of a metal bump and a metal post.

47. The short-circuit element according to claim 46, wherein in the metal bump or metal post, a low melting point metal layer is formed on a high melting point metal surface.

48. The short-circuit element according to claim 47, wherein the high melting point metal consists essentially of copper or silver, and the low melting point metal is a lead-free solder consisting essentially of tin.

49. The short-circuit element according to claim 45, wherein the external connecting terminal is a metal bump made of a lead-free solder consisting essentially of tin.

50. The short-circuit element according to claim 1 further comprising an insulating layer laminated on the insulating substrate,
wherein the first to fourth electrodes are arranged on the insulating layer, and
wherein the first and second heat-generating resistors are disposed within the insulating layer or between the insulating layer and the insulating substrate.

51. The short-circuit element according to claim 1, wherein the first and second heat-generating resistors are disposed within the insulating substrate.

52. The short-circuit element according to claim 1, wherein the first and second heat-generating resistors are disposed on a surface of the insulating substrate opposite to an electrode-forming surface.

53. The short-circuit element according to claim 1, wherein the first and second heat-generating resistors are disposed on an electrode-forming surface of the insulating substrate.

54. The short-circuit element according to claim 1, wherein surfaces of the first electrode and the second electrode are coated with one of Ni/Au plating, Ni/Pd plating and Ni/Pd/Au plating.

55. The short-circuit element according to claim 1, wherein the first electrode has an area wider than that of the third electrode, and the second electrode has an area wider than that of the fourth electrode.

56. The short-circuit element according to claim 1 further comprising:
a covering member arranged on the insulating substrate for internal protection; and
a covering member electrode arranged on an inner surface of the covering member,
wherein the covering member electrode is arranged at a position which overlaps the first electrode and the second electrode.

57. The short-circuit element according to claim 1 further comprising a protective resistor arranged on the insulating substrate and connected to one of the first electrode and the second electrode.

58. The short-circuit element according to claim 1, wherein the first and second meltable conductors are a Pb free solder consisting essentially of Sn.

59. The short-circuit element according to claim 1,
wherein the first and second meltable conductors contain a low melting point metal and a high melting point metal, and
wherein the low melting point metal is melted by a heat generated by the heat-generating resistor and erodes the high melting point metal.

60. The short-circuit element according to claim 59,
wherein the low melting point metal is a solder, and
wherein the high melting point metal is Ag, Cu or an alloy consisting essentially of Ag or Cu.

61. The short-circuit element according to claim 59, wherein the first and second meltable conductors have a coated structure in which the low melting point metal constitutes an inner layer and the high melting point metal constitutes an outer layer.

62. The short-circuit element according to claim 59, wherein the first and second meltable conductors have a coated structure in which the high melting point metal constitutes an inner layer and the low melting point metal constitutes an outer layer.

63. The short-circuit element according to claim 59, wherein the first and second meltable conductors have a laminated structure in which the low melting point metal and the high melting point metal are laminated.

64. The short-circuit element according to claim 59, wherein the first and second meltable conductors have a multi-layered structure having four or more layers in which the low melting point metal and the high melting point metal are alternately laminated.

65. The short-circuit element according to claim 59, wherein the first and second meltable conductors have a stripe-shaped structure in which the high melting point metal partially overlaps a surface of the low melting point metal.

66. The short-circuit element according to claim 59, wherein the first and second meltable conductors are constituted of a high melting point metal having a plurality of openings and a low melting point metal inserted in the openings.

67. The short-circuit element according to claim 59, wherein, in the first and second meltable conductors, the volume of the low melting point metal is larger than that of the high melting point metal.

68. The short-circuit element according to claim 1, wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

69. The short-circuit element according to claim 68, wherein the external connecting terminal is one of a metal bump and a metal post.

70. The short-circuit element according to claim 69, wherein in the metal bump or metal post, a low melting point metal layer is formed on a high melting point metal surface.

71. The short-circuit element according to claim 70, wherein the high melting point metal consists essentially of copper or silver, and the low melting point metal is a lead-free solder consisting essentially of tin.

72. The short-circuit element according to claim 68, wherein the external connecting terminal is a metal bump made of a lead-free solder consisting essentially of tin.

73. A short-circuit element circuit comprising:
a switch;
a first fuse connected to one end of the switch;
a second fuse connected to the other end of the switch;
a first heat-generating resistor connected to the other end of the first fuse opposite to the end connected to the switch; and
a second heat-generating resistor connected to the other end of the second fuse opposite to the end connected to the switch,
wherein the switch is short-circuited by meltable conductor of the first and second fuses when the first and second fuses are blown.

74. A compensation circuit comprising:
a short-circuit element comprising a switch, a first fuse connected to one end of the switch, a second fuse connected to the other end of the switch, a first heat-generating resistor connected to the other end of the first fuse opposite to the end connected to the switch, and a second heat-generating resistor connected to the other end of the second fuse opposite to the end connected to the switch, wherein the switch is short-circuited by meltable conductor of the first and second fuses when the first and second fuses are blown;
an electronic component;
a protective element connected in a current path of the electronic component, which disconnects the electrical connection to the electronic component in the case of an electronic;
a protective component which detects an abnormality of the electronic component and outputs an abnormal signal; and
a first to third controlling elements which operate in accordance with the abnormal signal from the protective component,
wherein both terminals of the electronic component and the protective element are connected to both terminals of the switch in parallel,
wherein the first and second heat-generating resistor, and an electric signal input terminal of the protective element are respectively connected to the first to third controlling elements, and
wherein, in an abnormal situation of the electronic component, the first to third controlling elements operate in accordance with an abnormal signal from the protective component to disconnect the current path of the electronic component with the protective element and to short-circuit the switch in conjunction with melting of the first and second fuses to form a bypass current path.

75. The compensation circuit according to claim 74, wherein the protective component, and the first to third controlling elements are controlled such that the protective element disconnects the current path and then the short-circuit element forms a bypass current path.

76. The compensation circuit according to claim 75, wherein a protective resistor having a resistance corresponding to an internal resistance of the electronic component is connected in the bypass current path.

77. The compensation circuit according to claim 74, wherein the electronic component is a battery cell having a risk of electrical short-circuit or thermal runaway occurring in an abnormal situation.

78. The compensation circuit according to claim 77, wherein a protective resistor having a resistance corresponding to an internal resistance of the electronic component is connected in the bypass current path.

79. The compensation circuit according to claim 74, wherein a protective resistor having a resistance corresponding to an internal resistance of the electronic component is connected in the bypass current path.

80. A compensation circuit comprising:
a short-circuit element comprising a switch, a first fuse connected to one end of the switch, a second fuse connected to the other end of the switch, a first heat-generating resistor connected to the other end of the first fuse opposite to the end connected to the switch, and a second heat-generating resistor connected to the other end of the second fuse opposite to the end connected to the switch, wherein the switch is short-circuited by meltable conductor of the first and second fuses when the first and second fuses are blown;
an electronic component;
a protective element connected in a current path of the electronic component, which disconnects the electrical connection to the electronic component in the case of an electronic signal;
a protective component which detects an abnormality of the electronic component and outputs an abnormal signal; and
a first and a second controlling elements which operate in accordance with the abnormal signal from the protective component,
wherein both terminals of the electronic component and the protective element are connected to both terminals of the switch in parallel,
wherein a terminal of the first heat-generating resistor is connected to the first controlling element, and a terminal of the second heat-generating resistor and an electric signal input terminal of the protective element are connected to the second controlling element, and wherein in an abnormal situation of the electronic component, the first and second controlling elements operate in accordance with an abnormal signal from the protective component to disconnect the current path of the electronic component with the protective element and to short-circuit the switch in conjunction with melting of the first and second fuses to form a bypass current path.

81. The compensation circuit according to claim 80, wherein a protective resistor having a resistance corresponding to an internal resistance of the electronic component is connected in the bypass current path.

82. The compensation circuit according to claim 80, wherein the protective component, and the first and second controlling elements are controlled such that the protective element disconnects the current path and then the short-circuit element forms a bypass current path.

83. The compensation circuit according to claim 82, wherein a protective resistor having a resistance corresponding to an internal resistance of the electronic component is connected in the bypass current path.

84. The compensation circuit according to claim 82, wherein the electronic component is a battery cell having a risk of electrical short-circuit or thermal runaway occurring in an abnormal situation.

85. The compensation circuit according to claim 80, wherein the electronic component is a battery cell having a risk of electrical short-circuit or thermal runaway occurring in an abnormal situation.

86. A short-circuit element circuit comprising:
a switch;
a first fuse connected to one end of the switch;
a second fuse connected to the other end of the switch;
a first heat-generating resistor connected to the other end of the first fuse opposite to the end connected to the switch;
a second heat-generating resistor connected to the other end of the second fuse opposite to the end connected to the switch; and
a protective resistor connected to the switch,
wherein the switch is short-circuited by meltable conductor of the first and second fuses when the first and second fuses are blown.

87. A compensation circuit comprising:
a short-circuit element comprising a switch, a first fuse connected to one end of the switch, a second fuse connected to the other end of the switch, a first heat-generating resistor connected to the other end of the first fuse opposite to the end connected to the switch, a second heat-generating resistor connected to the other end of the second fuse opposite to the end connected to the switch, and a protective resistor connected to the switch;
an electronic component;
a protective element connected in a current path of the electronic component, which disconnects the electrical connection to the electronic in the case of an electronic signal;
a protective component which detects an abnormality of the electronic component and outputs an abnormal signal; and
a first to third controlling elements which operate in accordance with the abnormal signal from the protective component, wherein both terminals of the electronic component and the protective element are connected to both terminals of the switch in parallel, wherein the first and second heat-generating resistor, and an electric signal input terminal of the protective element are respectively connected to the first to third controlling elements, and wherein, in an abnormal situation of the electronic component, the first to third controlling elements operate in accordance with an abnormal signal from the protective component to disconnect the current path of the electronic component with the protective element and to short-circuit the switch in conjunction with melting of the first and second fuses to form a bypass current path.

88. The compensation circuit according to claim 87, wherein the protective component, and the first to third controlling elements are controlled such that the protective element disconnects the current path and then the short-circuit element forms a bypass current path.

89. The compensation circuit according to claim 88, wherein the electronic component is a battery cell having a risk of electrical short-circuit or thermal runaway occurring in an abnormal situation.

90. The compensation circuit according to claim 87, wherein the electronic component is a battery cell having a risk of electrical short-circuit or thermal runaway occurring in an abnormal situation.

91. A compensation circuit comprising:
a short-circuit element comprising a switch, a first fuse connected to one end of the switch, a second fuse connected to the other end of the switch, a first heat-generating resistor connected to the other end of the first fuse opposite to the end connected to the switch, a second heat-generating resistor connected to the other end of the second fuse opposite to the end connected to the switch, and a protective resistor connected to the switch, wherein the switch is short-circuited by meltable conductor of the first and second fuses when the first and second fuses are blown;
an electronic component;
a protective element connected in a current path of the electronic component, which disconnects the electrical connection to the electronic component in the case of an electronic signal;
a protective component which detects an abnormality of the electronic component and outputs an abnormal signal; and
a first and a second controlling elements which operate in accordance with the abnormal signal from the protective component, wherein both terminals of the electronic component and the protective element are connected to both terminals of the switch in parallel, wherein a terminal of the first heat-generating resistor is connected to the first controlling element, and a terminal of the second heat-generating resistor and an electric signal input terminal of the protective element are connected to the second controlling element, and wherein in an abnormal situation of the electronic component, the first and second controlling elements operate in accordance with an abnormal signal from the protective component to disconnect the current path of the electronic component with the protective element and to short-circuit the switch in conjunction with melting of the first and second fuses to form a bypass current path.

92. The compensation circuit according to claim 91, wherein the protective component, and the first and second controlling elements are controlled such that the protective element disconnects the current path and then the short-circuit element forms a bypass current path.

93. The compensation circuit according to claim 92, wherein the electronic component is a battery cell having a risk of electrical short-circuit or thermal runaway occurring in an abnormal situation.

94. The compensation circuit according to claim 91, wherein the electronic component is a battery cell having a risk of electrical short-circuit or thermal runaway occurring in an abnormal situation.

95. A mounting member in which a short-circuit element is mounted onto a mounting target, the short-circuit element comprising:
   an insulating substrate;
   a first and a second heat-generating resistors formed on the insulating substrate;
   a first and a second electrodes arranged adjacently to each other on the insulating substrate;
   a third electrode arranged adjacently to the first electrode on the insulating substrate and electrically connected to the first heat-generating resistor;
   a fourth electrode arranged adjacently to the second electrode on the insulating substrate and electrically connected to the second heat-generating resistor;
   a first meltable conductor arranged between the first and third electrodes to constitute a current path capable of being blown by a heat generated by the first heat-generating resistor;
   a second meltable conductor arranged between the second and fourth electrodes to constitute a current path capable of being blown by a heat generated by the second heat-generating resistor; and
   a first external connecting electrode continuous with the first electrode formed on the same surface as the first and second electrodes, and a second external connecting electrode continuous with the second electrode,
   wherein the first electrode is connected to the mounting target via the first external connecting terminal connected to the first external connecting electrode, and the second electrode is connected to the mounting target via the second external connecting terminal connected to the second external connecting electrode, and
   wherein a combined resistance of the first external connecting terminal and the second external connecting terminal is lower than a conduction resistance between the first and second external connecting electrodes when the first meltable conductor is melted by the heat from the first and second heat-generating resistors and gathers on the first and second electrodes to short-circuit the first and second electrodes.

* * * * *